United States Patent
Hong et al.

(10) Patent No.: US 11,637,623 B2
(45) Date of Patent: *Apr. 25, 2023

(54) OPTICALLY ENHANCED SELF-INTERFERENCE CANCELLATION

(71) Applicant: Kumu Networks, Inc., Sunnyvale, CA (US)

(72) Inventors: Steven Hong, Sunnyvale, CA (US); Jeffrey Mehlman, Sunnyvale, CA (US); Joel Brand, Santa Clara, CA (US); Jung-Il Choi, Satatoga, CA (US); Mayank Jain, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,625

(22) Filed: Apr. 27, 2020

(65) Prior Publication Data

US 2020/0259555 A1 Aug. 13, 2020

Related U.S. Application Data

(63) Continuation of application No. 16/118,979, filed on Aug. 31, 2018, now Pat. No. 10,673,519, which is a
(Continued)

(51) Int. Cl.
*H04B 7/15* (2006.01)
*H04B 7/155* (2006.01)
(Continued)

(52) U.S. Cl.
CPC ......... *H04B 7/15585* (2013.01); *H04B 1/525* (2013.01); *H04B 7/0413* (2013.01)

(58) Field of Classification Search
CPC ...................................... H04B 7/155
See application file for complete search history.

(56) References Cited

U.S. PATENT DOCUMENTS 3,922,617 A 11/1975 Denniston et al.
4,321,624 A 3/1982 Gibson et al.
(Continued)

FOREIGN PATENT DOCUMENTS

CN 1373562 A 10/2002
CN 102694562 A 9/2012
(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.
(Continued)

*Primary Examiner* — Sulaiman Nooristany
(74) *Attorney, Agent, or Firm* — Jeffrey Schox; Samuel Rosenthal

(57) ABSTRACT

An optically-enhanced relay including a first transmitter that converts a first digital transmit signal to a first analog transmit signal, a first receiver that converts a first analog receive signal to a first digital receive signal, a second transmitter that converts a second digital transmit signal to a second analog transmit signal, a second receiver that converts a second analog receive signal to a second digital receive signal, and an optically-enhanced analog self-interference canceller that generates a first self-interference cancellation signal based on at least one of the first digital transmit signal and the first analog transmit signal, and combines the first self-interference cancellation signal with at least one of the first digital receive signal and the first analog receive signal.

19 Claims, 21 Drawing Sheets

Related U.S. Application Data continuation-in-part of application No. 14/473,653, filed on Aug. 29, 2014, now Pat. No. 10,177,836.

(60) Provisional application No. 61/871,519, filed on Aug. 29, 2013.

(51) Int. Cl.
*H04B 1/525* (2015.01)
*H04B 7/0413* (2017.01)

(56) References Cited

U.S. PATENT DOCUMENTS

| | | |
|---|---|---|
| 4,952,193 A | 8/1990 | Talwar |
| 5,212,827 A | 5/1993 | Meszko et al. |
| 5,691,978 A | 11/1997 | Kenworthy |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,240,150 B1 | 5/2001 | Darveau et al. |
| 6,317,583 B1 | 11/2001 | Wolcott et al. |
| 6,411,250 B1 | 6/2002 | Oswald et al. |
| 6,529,305 B1 * | 3/2003 | Meeker ............ H04J 14/0298 385/94 |
| 6,539,204 B1 | 3/2003 | Marsh et al. |
| 6,567,649 B2 | 5/2003 | Souissi |
| 6,639,551 B2 | 10/2003 | Li et al. |
| 6,657,950 B1 | 12/2003 | Jones et al. |
| 6,725,017 B2 | 4/2004 | Blount et al. |
| 6,915,112 B1 | 7/2005 | Sutton et al. |
| 6,965,657 B1 | 11/2005 | Rezvani et al. |
| 7,139,543 B2 | 11/2006 | Shah |
| 7,336,940 B2 | 2/2008 | Smithson |
| 7,349,505 B2 | 3/2008 | Blount et al. |
| 7,362,257 B2 | 4/2008 | Bruzzone et al. |
| 7,397,843 B2 | 7/2008 | Grant et al. |
| 7,426,242 B2 | 9/2008 | Thesling |
| 7,509,100 B2 | 3/2009 | Toncich |
| 7,706,755 B2 | 4/2010 | Muhammad et al. |
| 7,761,069 B1 * | 7/2010 | Studenberg, Jr. ........ H04B 1/40 455/143 |
| 7,778,611 B2 | 8/2010 | Asai et al. |
| 7,869,527 B2 | 1/2011 | Vetter et al. |
| 7,987,363 B2 | 7/2011 | Chauncey et al. |
| 8,005,235 B2 | 8/2011 | Rebandt et al. |
| 8,027,642 B2 | 9/2011 | Proctor et al. |
| 8,055,235 B1 | 11/2011 | Gupta et al. |
| 8,060,803 B2 | 11/2011 | Kim |
| 8,081,695 B2 | 12/2011 | Chrabieh et al. |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,274,342 B2 | 9/2012 | Tsutsumi et al. |
| 8,331,477 B2 | 12/2012 | Huang et al. |
| 8,349,933 B2 | 1/2013 | Bhandari et al. |
| 8,351,533 B2 | 1/2013 | Shrivastava et al. |
| 8,385,871 B2 | 2/2013 | Wyville |
| 8,417,750 B2 | 4/2013 | Yan et al. |
| 8,422,540 B1 | 4/2013 | Negus et al. |
| 8,457,549 B2 | 6/2013 | Weng et al. |
| 8,462,697 B2 | 6/2013 | Park et al. |
| 8,502,924 B2 | 8/2013 | Liou et al. |
| 8,521,090 B2 | 8/2013 | Kim et al. |
| 8,711,943 B2 | 4/2014 | Rossato et al. |
| 8,755,756 B1 | 6/2014 | Zhang et al. |
| 8,842,584 B2 | 9/2014 | Jana et al. |
| 8,995,410 B2 | 3/2015 | Balan et al. |
| 9,019,849 B2 | 4/2015 | Hui et al. |
| 9,042,838 B2 | 5/2015 | Braithwaite |
| 9,054,795 B2 | 6/2015 | Choi et al. |
| 9,077,421 B1 | 7/2015 | Mehlman et al. |
| 9,124,475 B2 | 9/2015 | Li et al. |
| 9,136,883 B1 | 9/2015 | Moher et al. |
| 9,184,902 B2 | 11/2015 | Khojastepour et al. |
| 9,231,647 B2 | 1/2016 | Polydoros et al. |
| 9,312,895 B1 | 4/2016 | Gupta et al. |
| 9,461,698 B2 | 10/2016 | Moffatt et al. |
| 2002/0034191 A1 | 3/2002 | Shattil |
| 2002/0063935 A1* | 5/2002 | Price ............... H04B 10/50575 398/158 |
| 2002/0064245 A1 | 5/2002 | McCorkle |
| 2002/0154717 A1 | 10/2002 | Shima et al. |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0249314 A1 | 10/2007 | Sanders et al. |
| 2007/0274372 A1 | 11/2007 | Asai et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0144852 A1 | 6/2008 | Rebandt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0116415 A1 | 5/2009 | Kashima et al. |
| 2009/0180404 A1 | 7/2009 | Jung et al. |
| 2009/0186582 A1 | 7/2009 | Muhammad et al. |
| 2009/0221231 A1 | 9/2009 | Murch et al. |
| 2009/0303908 A1 | 12/2009 | Deb et al. |
| 2009/0325509 A1 | 12/2009 | Mattisson et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Ahn et al. |
| 2010/0105320 A1 | 4/2010 | Seki |
| 2010/0117693 A1 | 5/2010 | Buer et al. |
| 2010/0136900 A1 | 6/2010 | Seki |
| 2010/0150033 A1 | 6/2010 | Zinser et al. |
| 2010/0150070 A1 | 6/2010 | Chae et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0171922 A1 | 7/2011 | Kim et al. |
| 2011/0195657 A1 | 8/2011 | Takeda et al. |

(56) References Cited

U.S. PATENT DOCUMENTS

| | | |
|---|---|---|
| 2011/0216813 A1 | 9/2011 | Baldemair et al. |
| 2011/0222631 A1 | 9/2011 | Jong |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0056270 A1 | 3/2013 | Ward |
| 2013/0089009 A1 | 4/2013 | Li et al. |
| 2013/0102254 A1* | 4/2013 | Cyzs ............... H04B 1/525 455/63.1 |
| 2013/0114468 A1 | 5/2013 | Hui et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0294523 A1 | 11/2013 | Rossato et al. |
| 2013/0301487 A1 | 11/2013 | Khandani |
| 2013/0301488 A1* | 11/2013 | Hong ............... H04B 1/56 370/278 |
| 2013/0308717 A1 | 11/2013 | Maltsev et al. |
| 2014/0011461 A1 | 1/2014 | Bakalski et al. |
| 2014/0016515 A1 | 1/2014 | Jana et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0376416 A1 | 12/2014 | Choi |
| 2015/0139122 A1 | 5/2015 | Rimini et al. |
| 2015/0146765 A1 | 5/2015 | Moffatt et al. |
| 2015/0156003 A1 | 6/2015 | Khandani |
| 2015/0156004 A1 | 6/2015 | Khandani |
| 2015/0171903 A1 | 6/2015 | Mehlman et al. |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0270865 A1 | 9/2015 | Polydoros et al. |
| 2015/0303984 A1 | 10/2015 | Braithwaite |
| 2015/0341125 A1* | 11/2015 | Bharadia ............... H04B 1/00 370/277 |
| 2016/0218769 A1 | 7/2016 | Chang et al. |
| 2018/0034550 A1* | 2/2018 | Rakich ............... H04B 10/2575 |

FOREIGN PATENT DOCUMENTS

| | | |
|---|---|---|
| EP | 0755141 A3 | 10/1998 |
| EP | 1959625 B1 | 2/2009 |
| EP | 2237434 A1 | 10/2010 |
| EP | 2267946 A2 | 12/2010 |
| EP | 3039798 A1 | 7/2016 |
| JP | 2007180597 A | 7/2007 |
| JP | 2010103719 A | 5/2010 |
| JP | 2011166529 A | 8/2011 |
| RU | 2256985 C2 | 7/2005 |
| WO | 2008108528 A1 | 9/2008 |
| WO | 2013056270 A1 | 4/2013 |
| WO | 2013095386 A1 | 6/2013 |
| WO | 2013173250 A1 | 11/2013 |
| WO | 2013185106 A1 | 12/2013 |
| WO | 2014093916 A1 | 6/2014 |

OTHER PUBLICATIONS

Korean Office Action for Application No. 10-2016-7007587, dated Feb. 11, 2020.

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

Chinese Office Action for application No. 201480046415.0, dated Dec. 10, 2019.

European Office Action for application No. 14839148.5 dated Feb. 15, 2021.

* cited by examiner

OPTICALLY ENHANCED SELF-INTERFERENCE CANCELLATION

CROSS-REFERENCE TO RELATED APPLICATIONS

This application is a continuation of U.S. patent application Ser. No. 16/118,979, filed 31 Aug. 2018, which is a continuation-in-part of U.S. patent application Ser. No. 14/473,653, filed on 29 Aug. 2014, which claims the benefit of U.S. Provisional Application Ser, No. 61/871,519, filed on 29 Aug. 2013, all of which are incorporated in their entireties by this reference.

TECHNICAL FIELD

This invention relates generally to the wireless communications field, and more specifically to new and useful systems for optically enhanced self-interference cancellation.

BACKGROUND

In many wireless communication networks, there are areas that are not easily covered by access points due to signal attenuation by terrain or other structural obstacles. One approach to extending access point signal coverage involves using relay nodes that rebroadcast signals originating from and/or destined to access points.

One major roadblock to successful implementation of relays is the problem of self-interference; relays may suffer from issues resulting from cross-talk between transmitters and receivers, duplexer leakages, or other undesired electromagnetic couplings. Many modern relays use frequency or time division multiplexing techniques or antenna separation techniques to address self-interference. Each of these techniques has substantial drawbacks: frequency division multiplexing requires doubling spectrum usage, time division multiplexing requires halving signal capacity, and antenna separation is often expensive, if not impossible given space constraints. Full-duplex relays may address self-interference without any of these drawbacks. Full-duplex communication technology may find use not only in relays, but also in a wide variety of communications applications.

In all of these full-duplex applications circuit design choices must be made. While traditional analog electronics and digital electronics are common choices for such circuits, in some cases, the drawbacks of these technologies (e.g., loss, size, cost, bandwidth) may prove prohibitive. Photonic, optoelectronic, opto-acoustic, and/or optomechanical circuits may address these concerns. Thus, there is a need in the wireless communications field to create new and useful systems for optically enhanced self-interference cancellation. This invention provides such new and useful systems.

DESCRIPTION OF THE PREFERRED EMBODIMENTS

Figure 1:
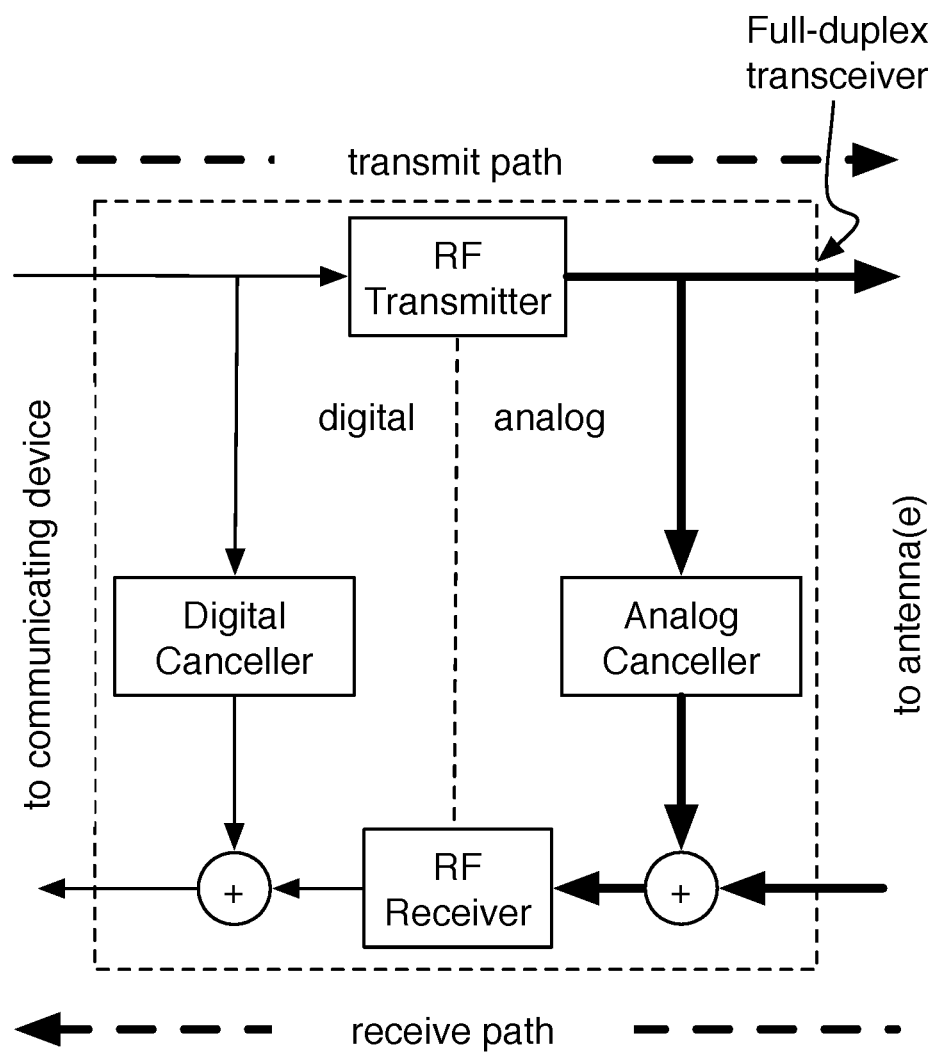
FIG. 1 is a schematic representation of a full-duplex transceiver.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband analog signals, intermediate frequency (IF) analog signals, or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF/IF digital signals or baseband digital signals). In many full-duplex transceivers, an analog self-interference cancellation system is paired with a digital self-interference cancellation system. The analog cancellation system removes a first portion of self-interference by summing delayed and scaled versions of the RF transmit signal to create an RF self-interference signal, which is then subtracted from the RF receive signal. Alternatively, the analog cancellation system may perform similar tasks at an intermediate frequency. After the RF (or IF) receive signal has the RF/IF self-interference signal subtracted, it passes through an analog-to-digital converter of the receiver (and becomes a digital receive signal). After this stage, a digital self-interference cancellation signal (created by transforming a digital transmit signal) is then subtracted from the digital receive signal.

The systems and methods described herein increase the performance of full-duplex transceivers as shown in FIG. 1 (and other applicable systems) by mitigating receiver dynamic range issues, thus allowing for increased effectiveness in self-interference cancellation. Other applicable systems include active sensing systems (e.g., RADAR), wired communications systems, wireless communications systems, channel emulators, reflectometers, PIM analyzers and/or any other suitable measurement equipment system, including communication systems where transmit and receive bands are close in frequency, but not overlapping, or even TDD (time division duplex) systems.

2. Optically Enhanced Full-Duplex Relays

Figure 2:
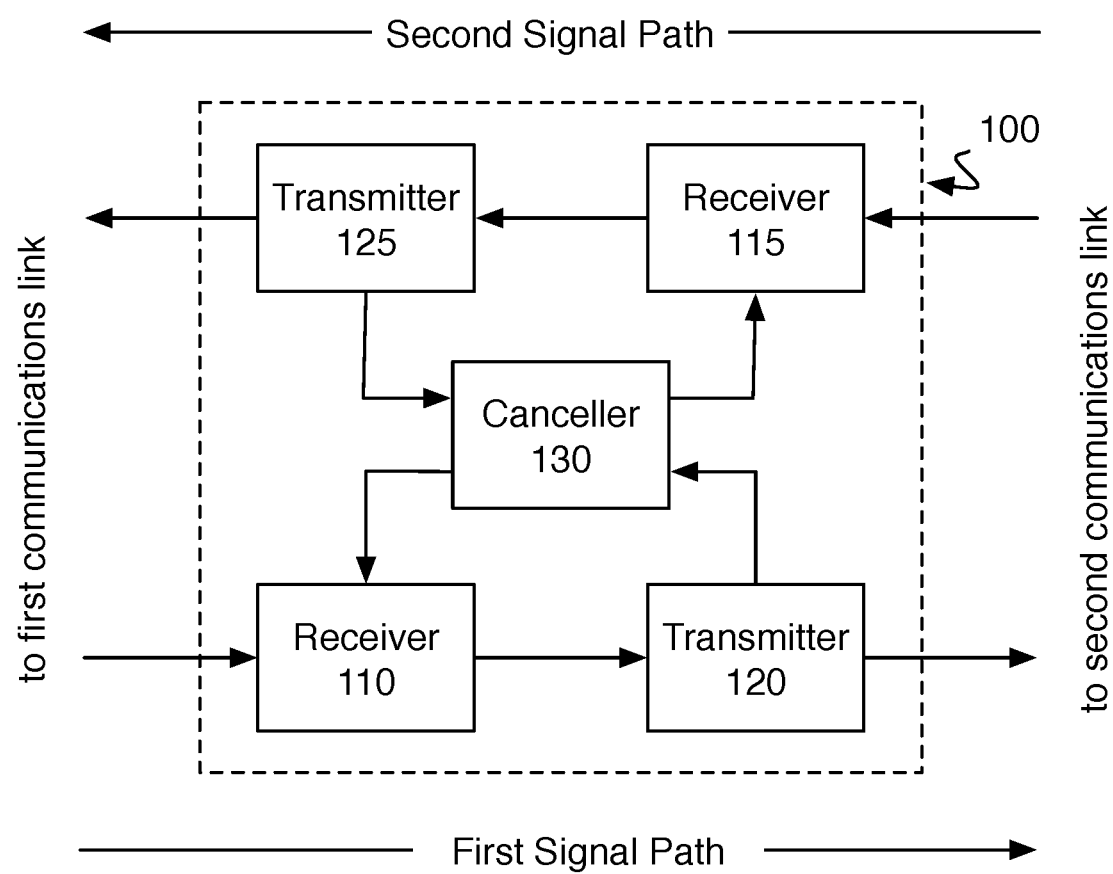
FIG. 2 is a diagram representation of a system of a preferred embodiment.

As shown in FIG. 2, a relay 100 includes a first receiver 110, a first transmitter 120, a second receiver 115, a second transmitter 125, and a self-interference canceller 130. The relay 100 functions to repeat communication signals transmitted and received between two communications systems. In addition to repeating signals, the relay 100 preferably cancels self-interference between transmitted and received signals. The relay 100 may additionally or alternatively scale (e.g. amplify, attenuate), shift, or otherwise modify signals received or transmitted by the relay 100.

The relay 100 is preferably used to repeat communication signals traveling bi-directionally between two wireless communication systems (e.g. a cell-phone tower and a cell phone, or a Wi-Fi™ access point and a computer, two wireless radios), but may additionally or alternatively be used to repeat communications signals between any other suitable wired or wireless communication systems. In a variation of a preferred embodiment, the relay 100 is a one-way relay and includes only a first receiver 110, a first transmitter 120, and a self-interference canceller 130.

The relay 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. Additionally or alternatively, the relay 100 may make use of any other signal processing components; e.g., photonic, optoelectronic, opto-acoustic, optomechanical, acoustic, thermal, and/or mechanical waveguides, passive components, active components, attenuators, amplifiers, filters, cavities, and/or structures. The relay 100 preferably includes memory to store configuration data, but may additionally or alternatively be configured using externally stored configuration data or in any suitable manner.

In one example implementation, the relay 100 is used as a cellular repeater. The relay 100 is connected to a cell tower by a first communications link using a first transmit/receive antenna coupled to the relay Dm by a duplexer, and to a cell phone by a second communications link using a second transmit/receive antenna coupled to the relay 100 by a duplexer. The cell phone and cell tower natively communicate at an uplink frequency (from phone to tower) and a downlink frequency (from tower to phone). The relay Dm receives and re-transmits communication on both the uplink frequency (phone to relay to tower) and the downlink frequency (tower to relay to phone). The self-interference canceller 130 enables full-duplex operation for the first transmit/receive antenna and the second transmit receive/antenna. This is distinct from traditional relays, which must rely on techniques like time-division multiplexing or antenna isolation to avoid self-interference. More specifically, the self-interference canceller 130 may enable the relay 100 to receive downlink communications (from tower to relay), retransmit downlink communications (from relay to phone), receive uplink communications (from phone to relay), and retransmit uplink communications (from relay to tower) simultaneously, without requiring antennas to be isolated from one another, the use of additional frequencies, or the use of time multiplexing. Thus, the relay 100 is able to provide network-relaying capability without excess cost, excess spectrum usage, or significantly decreased data capacity.

The first receiver 110 functions to receive analog receive signals transmitted by a first communications system over a first communications link (e.g., a wireless channel, a coaxial cable). The first receiver 110 preferably converts analog receive signals into digital receive signals for processing before re-transmission by the first transmitter 120, but may additionally or alternatively not convert analog receive signals (passing them through directly without conversion).

The first receiver 110 is preferably a radio-frequency (RF) receiver, but may additionally or alternatively be any suitable receiver.

Figure 3A:
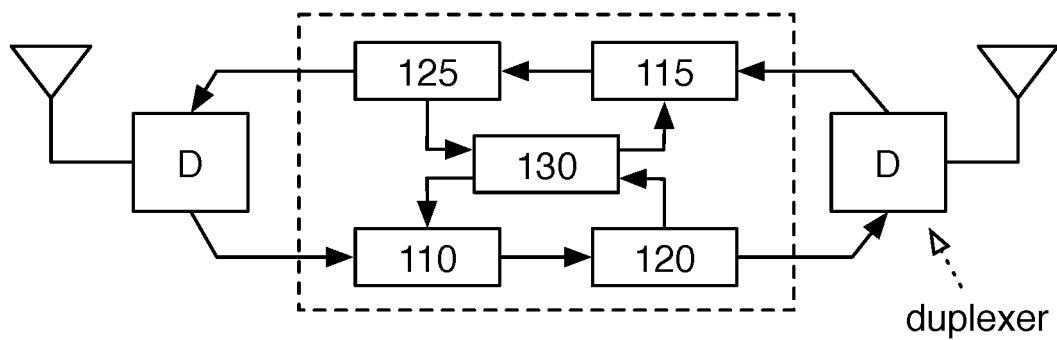
FIGS. 3A, 3B, and 3C are diagram representations of antenna couplings of a system of a preferred embodiment.
Figure 3B:
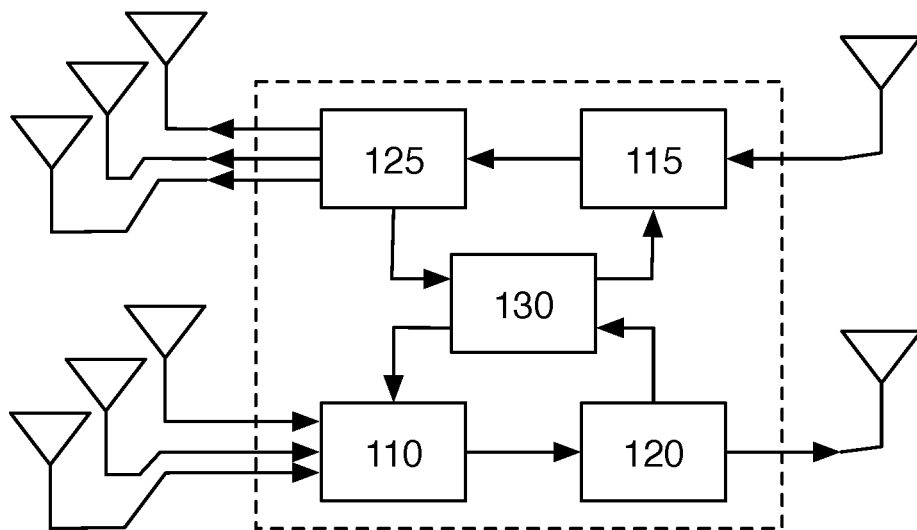
Figure 3C:
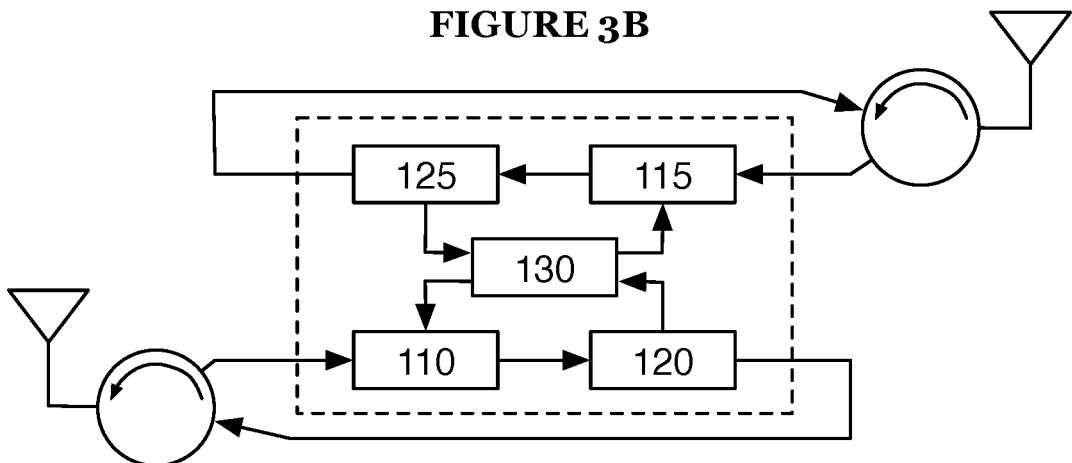

The first receiver 110 is preferably coupled to the first communications link by a duplexer-coupled RF antenna as shown in FIG. 3A, but may additionally or alternatively be coupled to the first communications link in any suitable manner. Some examples of alternative couplings include coupling via one or more dedicated receive antennas (as shown in FIG. 3B). In another alternative coupling, the first receiver 110 may be coupled to the first communications link by a circulator-coupled RF antenna as shown in FIG. 3C.

Figure 4:
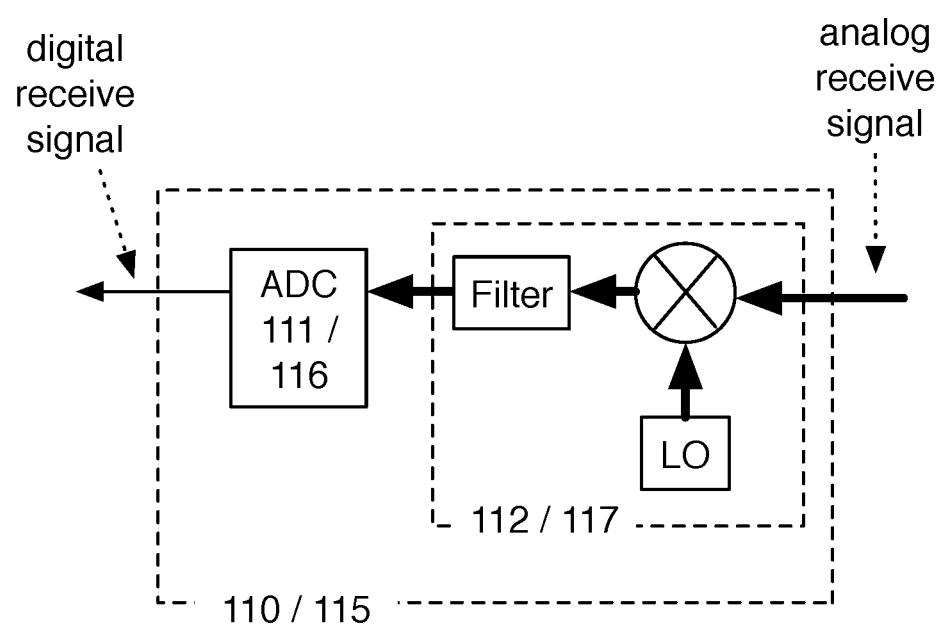
FIG. 4 is a schematic representation of a receiver of a system of a preferred embodiment.

The first receiver 110 preferably includes an analog-to-digital converter (ADC) 111 and a frequency downconverter 112, as shown in FIG. 4. The first receiver 110 may additionally or alternatively include amplifiers, filters, signal processors and/or any other suitable components. In one variation of a preferred embodiment, the first receiver 110 includes only analog processing circuitry (e.g., amplifiers, filters, attenuators, delayers). The first receiver may function to scale, shift, and/or otherwise modify the receive signal. The downconverter 112 functions to downconvert the analog receive signal from RF (or any other suitable frequency) to a baseband analog receive signal, and the analog-to-digital converter (ADC) 111 functions to convert the baseband analog receive signal to a digital receive signal.

The ADC 111 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

The frequency downconverter 112 functions to downconvert the carrier frequency of the analog receive signal to baseband, preparing it for conversion to a digital receive signal. The downconverter 112 preferably accomplishes signal downconversion using heterodyning methods, but may additionally or alternatively use any suitable upconversion methods.

The downconverter 112 preferably includes a local oscillator (LO), a mixer, and a baseband filter. The local oscillator functions to provide a frequency shift signal to the mixer; the mixer combines the frequency shift signal and the analog receive signal to create (usually two) frequency shifted signals, one of which is the baseband signal, and the baseband filter rejects signals other than the baseband analog receive signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, or any other suitable type of filter. The baseband filter is preferably a passive filter, but may additionally or alternatively be an active filter. The baseband filter is preferably implemented with analog circuit components, but may additionally or alternatively be digitally implemented.

The second receiver 115 functions to receive analog receive signals transmitted by a second communications system over a second communications link (e.g., a wireless channel, a coaxial cable). The second receiver 115 preferably converts analog receive signals into digital receive signals for processing before re-transmission by the second transmitter 125, but may additionally or alternatively not convert analog receive signals (passing them through directly without conversion).

The second receiver 115 preferably includes an analog-to-digital converter (ADC) 116 and a frequency downconverter 117, as shown in FIG. 4. The second receiver 115 is preferably substantially similar to the first receiver 110, but may additionally or alternatively be any suitable receiver.

The first transmitter 120 functions to retransmit signals received by the first receiver 110. The first transmitter 120 preferably converts digital transmit signals into analog transmit signals, but may additionally or alternatively receive and retransmit analog transmit signals from the first receiver 110, thus avoiding digital-to-analog conversion. The transmit signals are preferably formed by processing receive signals (which may include analog-to-digital conversion or frequency shifting, for example) by the first receiver 110, but the transmit signals may additionally or alternatively be any signal intended for transmission by the relay 100. The first transmitter 120 preferably transmits signals over a second communications link to a second communications system; these signals are preferably retransmitted signals from a first communication system sent to the relay 100 over a first communications link, but may additionally or alternatively be any suitable signals.

The first transmitter 120 is preferably a radio-frequency (RF) transmitter, but may additionally or alternatively be any suitable transmitter.

The first transmitter 120 is preferably coupled to the second communications link by a duplexer-coupled RF antenna as shown in FIG. 3A, but may additionally or alternatively be coupled to the second communications link in any suitable manner. Some examples of alternative couplings include coupling via one or more dedicated transmit antennas (as shown in FIG. 3B). In another alternative coupling, the first transmitter 120 may be coupled to the second communications link by a duplexer-coupled RF antenna as shown in FIG. 3C.

Figure 5:
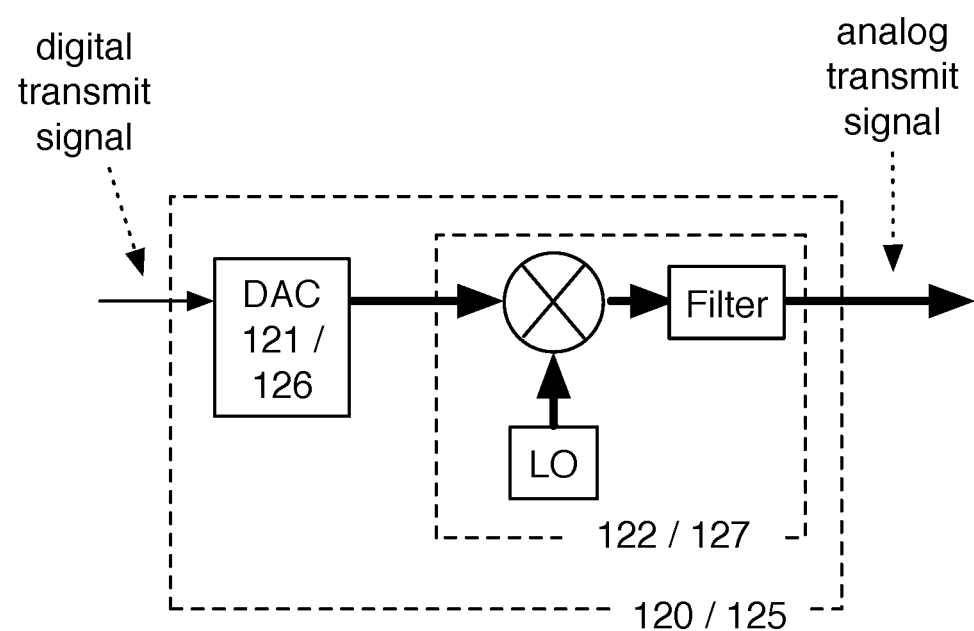
FIG. 5 is a schematic representation of a transmitter of a system of a preferred embodiment.

The first transmitter 120 preferably includes a digital-to-analog converter (DAC) 121 and a frequency upconverter 122, as shown in FIG. 5. The first transmitter 120 may additionally or alternatively include amplifiers, filters, signal processors and/or any other suitable components. The first transmitter 120 may function to scale, shift, and/or otherwise modify the transmit signal. The digital-to-analog converter (DAC) 121 functions to convert the digital transmit signal to a baseband analog transmit signal, and the upconverter 122 functions to upconvert the baseband analog transmit signal from baseband to RF (or any other intended transmission frequency).

The DAC 121 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

The frequency upconverter 122 functions to upconvert the carrier frequency of the baseband analog transmit signal to a radio frequency, preparing it for transmission over the communications link. The upconverter 122 preferably accomplishes signal upconversion using heterodyning methods, but may additionally or alternatively use any suitable upconversion methods.

The upconverter 122 preferably includes a local oscillator (LO), a mixer, and an RF filter. The local oscillator functions to provide a frequency shift signal to the mixer; the mixer combines the frequency shift signal and the baseband analog transmit signal to create (usually two) frequency shifted signals, one of which is the RF analog transmit signal, and the RF filter rejects signals other than the RF analog transmit signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The RF filter is preferably a bandpass filter centered around a tunable radio frequency. Additionally or alternatively, the RF filter may be a bandpass filter centered around a set radio frequency, or any other suitable type of filter. The RF filter is preferably a passive filter, but may additionally or alternatively be an active filter. The RF filter is preferably implemented with analog circuit components, but may additionally or alternatively be digitally implemented.

The second transmitter 125 functions to retransmit signals received by the second receiver 115. The second transmitter 125 preferably converts digital transmit signals into analog transmit signals, but may additionally or alternatively receive and retransmit analog signals from the second receiver 115, thus avoiding digital-to-analog conversion. The transmit signals are preferably formed by processing receive signals (which may include analog-to-digital conversion or frequency shifting, for example) by the second receiver 115, but the transmit signals may additionally or alternatively be any signal intended for transmission by the relay 100. The second transmitter 125 preferably transmits signals over a first communications link to a first communications system; these signals are preferably retransmitted signals from a second communication system sent to the relay 100 over a second communications link, but may additionally or alternatively be any suitable signals.

The second transmitter 125 preferably includes a digital-to-analog converter (DAC) 126 and a frequency upconverter 127, as shown in FIG. 4. The second transmitter 125 is preferably substantially similar to the first transmitter 120, but may additionally or alternatively be any suitable transmitter.

The self-interference canceller 130 functions to reduce self-interference in the relay 100 by canceling self-interference components present in receive signals of the relay 100. The self-interference canceller 130 preferably includes one or more analog self-interference cancellers 131; the self-interference canceller 130 may additionally or alternatively include a digital self-interference canceller 132, as shown in FIG. 6.

Analog self-interference cancellers 131 preferably reduce self-interference by sampling an analog transmit signal and generating an analog self-interference cancellation signal based on the input analog transmit signal. The analog self-interference cancellation signal is preferably combined with an analog receive signal before the analog receive signal is received by a receiver (e.g., 110 or 115), but may additionally or alternatively be combined with the receive signal at any suitable location or time.

Figure 6:
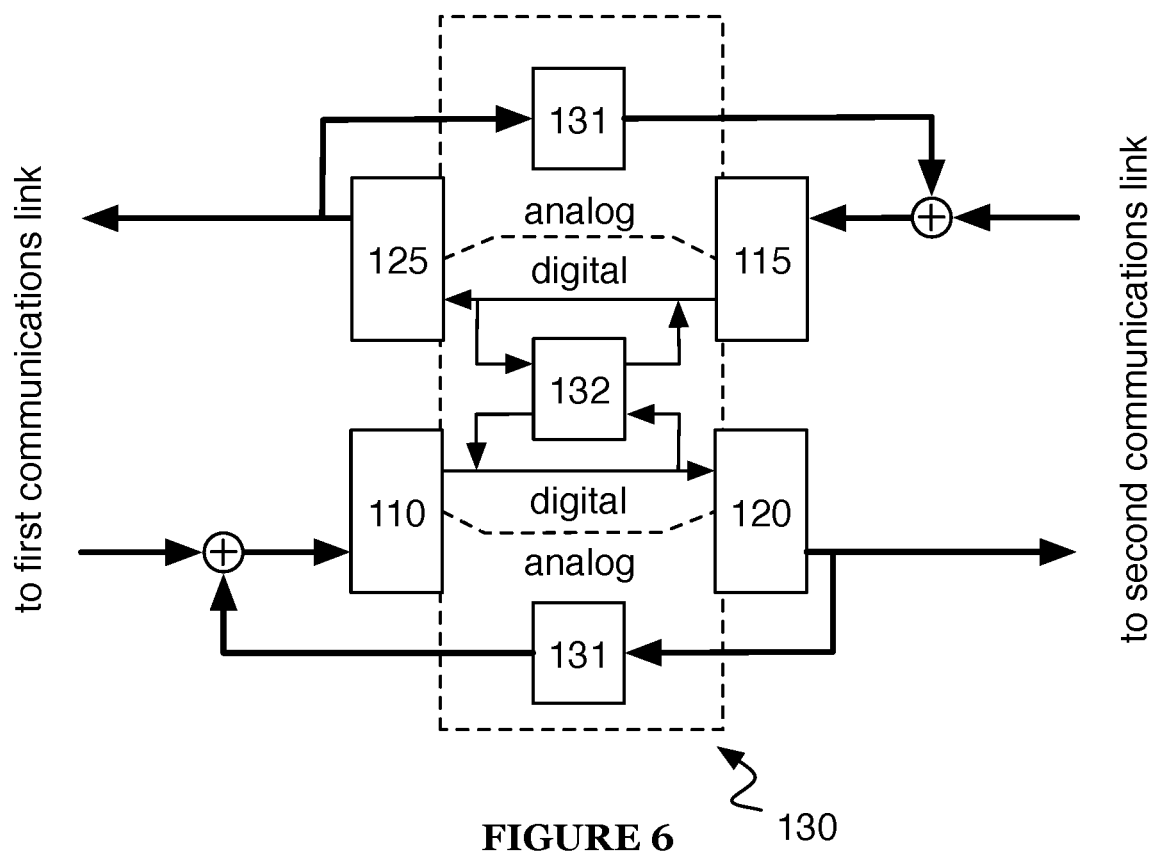
FIG. 6 is a diagram representation of a self-interference canceller of a system of a preferred embodiment.

Analog self-interference cancellers 131 preferably generate self-interference cancellation signals for a given analog receive signal from a corresponding direction analog transmit signal as shown in FIG. 6 (e.g., the self-interference cancellation signal combined with a re-transmitted uplink signal is preferably generated from the received uplink signal). Additionally or alternatively, analog self-interference cancellers 131 may generate self-interference cancellation signals for a given analog receive signal from any other analog transmit signal.

Figure 7:
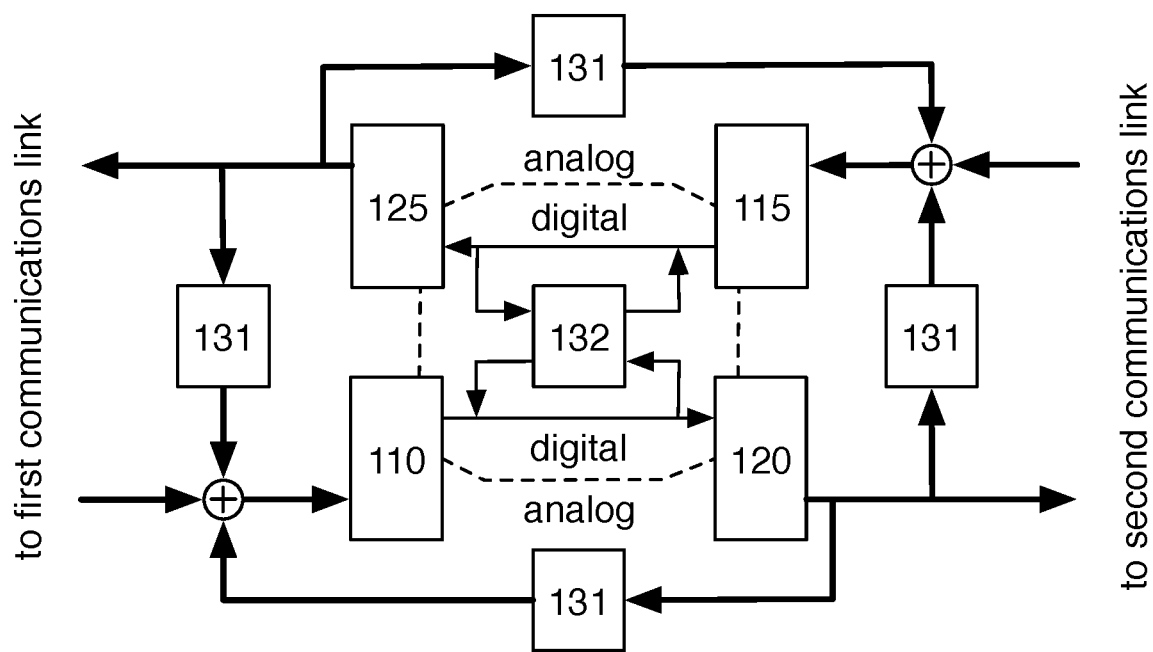
FIG. 7 is a diagram representation of a self-interference canceller of a system of a preferred embodiment.

For example, in situations where the relay 100 relays bi-directional communication (e.g., uplink/downlink) on well-separated frequencies, self-interference in the downlink receiver occurring from the uplink transmitter may be negligible (or vice versa); however, in situations where the uplink and downlink frequencies are closer, self-interference may occur across channels. In these situations it might be desirable to have hetero-channel as well as homo-channel self-interference cancellation, as shown in FIG. 7.

The analog self-interference canceller 131 is preferably implemented as an analog circuit that transforms an analog transmit signal into an analog self-interference cancellation signal by combining a set of filtered, scaled, and/or delayed versions of the analog transmit signal, but may additionally or alternatively be implemented as any suitable circuit. For instance, the analog self-interference canceller 131 may perform a transformation involving only a single version or copy of the analog transmit signal. The transformed signal (i.e. the analog self-interference cancellation signal) preferably represents at least a part of the self-interference component received at a coupling point of the relay 100 to a communications link (e.g. a receive antenna).

As stated previously, the canceller 131 may make use of any digital or analog circuitry as well as any other signal processing components; e.g., photonic, optoelectronic, opto-acoustic, optomechanical, acoustic, thermal, and/or mechanical waveguides, passive components, active components, attenuators, amplifiers, filters, cavities, and/or structures.

The analog self-interference canceller 131 is preferably adaptable to changing self-interference parameters in addition to changes in the analog transmit signal; for example, transmitter temperature, ambient temperature, antenna configuration, humidity, and transmitter power. Adaptation of the analog self-interference canceller 131 is preferably performed by a control circuit or other control mechanism included in the canceller 131, but may additionally or alternatively be performed by any suitable controller.

The analog self-interference canceller 131 is preferably coupled to signal paths by short section directional transmission line couplers, but may additionally or alternatively be coupled by any power dividers, power combiners, directional couplers, or other types of signal splitters suitable for coupling signal paths of the relay 100 to the analog self-interference canceller 131.

The analog self-interference canceller 131 is preferably substantially similar to the analog self-interference canceller 200, described in more detail in section 3, but may additionally or alternatively be any analog self-interference canceller. Implementations of the analog self-interference canceller 131 including optical/photonic circuitry may enable optical enhancement of the full duplex relay 100.

The digital self-interference canceller 132 functions to reduce self-interference in the relay 100 by canceling self-interference components present in digital receive signals. The digital self-interference canceller 132 preferably performs both linear and non-linear digital self-interference cancellation, but alternatively may only perform one of the two.

The digital self-interference canceller 132 preferably reduces digital self-interference by sampling one or more digital transmit signals and generating one or more digital self-interference cancellation signals based on input sampled digital transmit signals (and a transform configuration). Digital self-interference cancellation signals may be combined with corresponding receive signals at any time or location. The digital self-interference canceller 132 preferably removes self-interference signal components not removed by analog self-interference cancellers 131. Note that signal components may be any part of a signal (including a duplicate of the signal itself).

The digital self-interference canceller 132 preferably samples digital transmit signals of the relay 100 (additionally or alternatively, the canceller 132 may sample analog transmit signals or any other suitable transmit signals) and transforms the digital transmit signals to digital self-interference cancellation signals based on one or more digital transform configurations. The digital transform configuration preferably includes settings that dictate how the digital self-interference canceller 132 transforms a digital transmit signal to a digital self-interference cancellation signal (e.g. coefficients of a generalized memory polynomial used to transform the transmit signal to a self-interference signal).

Figure 8A:
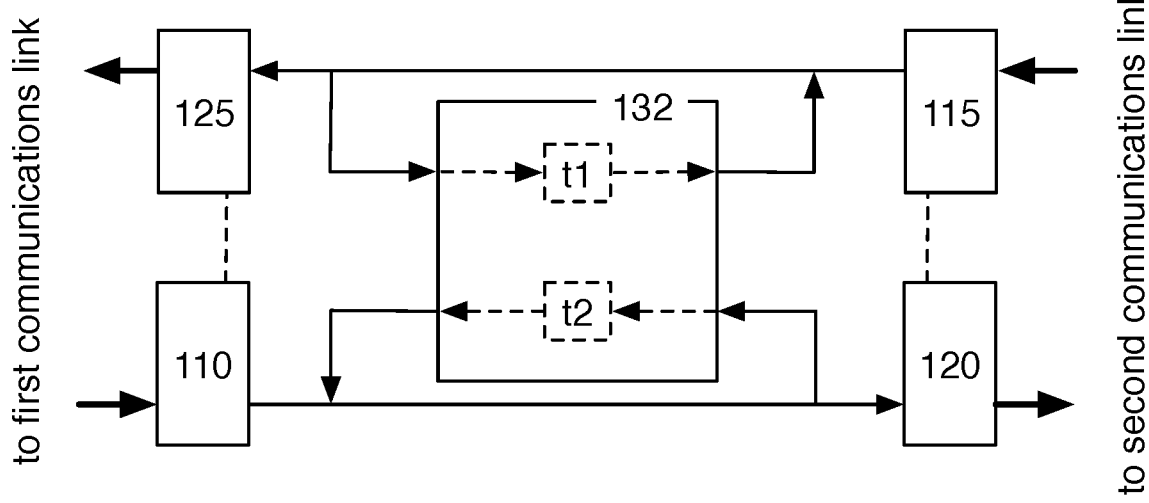
FIGS. 8A and 8B are diagram representations of a digital self-interference canceller of a system of a preferred embodiment.

The digital self-interference canceller 132 preferably generates self-interference cancellation signals for a given digital receive signal from a corresponding direction digital transmit signal as shown in FIG. 8A (e.g., the self-interference cancellation signal combined with a re-transmitted uplink signal is preferably generated from the received uplink signal). Additionally or alternatively, the digital self-interference canceller 132 may generate self-interference cancellation signals for a given digital receive signal from any other transmit signal or combination of transmit signals (including analog transmit signals converted using ADCs).

Figure 8B:
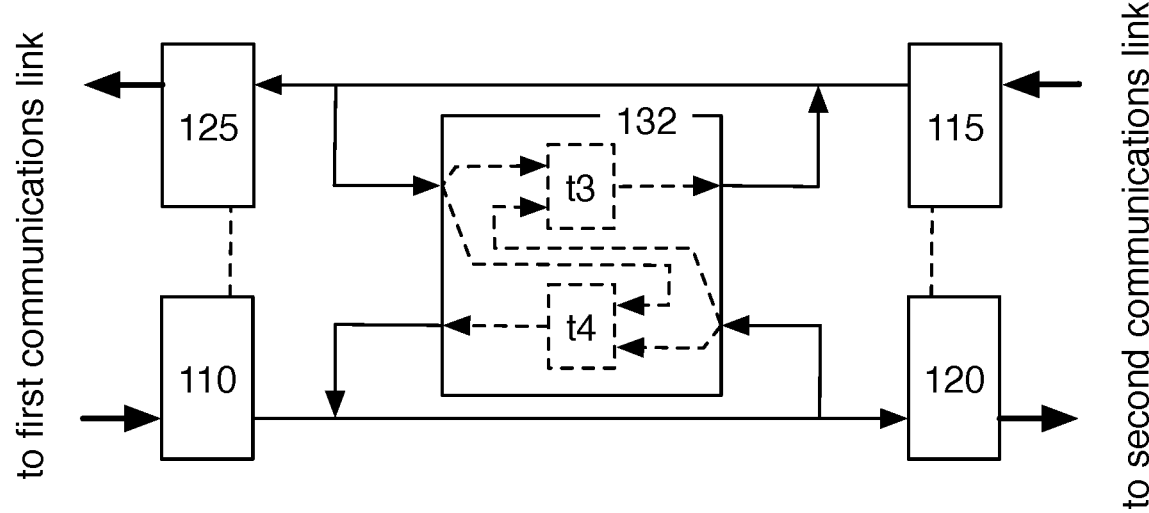

For example, in situations where the relay 100 relays bi-directional communication (e.g., uplink/downlink) on well-separated frequencies, self-interference in the downlink receiver occurring from the uplink transmitter may be negligible (or vice versa); however, in situations where the uplink and downlink frequencies are closer, self-interference may occur across channels. In these situations it might be desirable to have hetero-channel as well as homo-channel self-interference cancellation, as shown in FIG. 8B.

Each self-interference cancellation signal generated by the digital self-interference canceller 132 is preferably associated with a configuration transform (e.g., t1, t2, t3, and t4 of FIGS. 8A and 8B); additionally or alternatively, configuration transforms may be associated with digital self-interference cancellation signals in any suitable manner.

Figure 9:
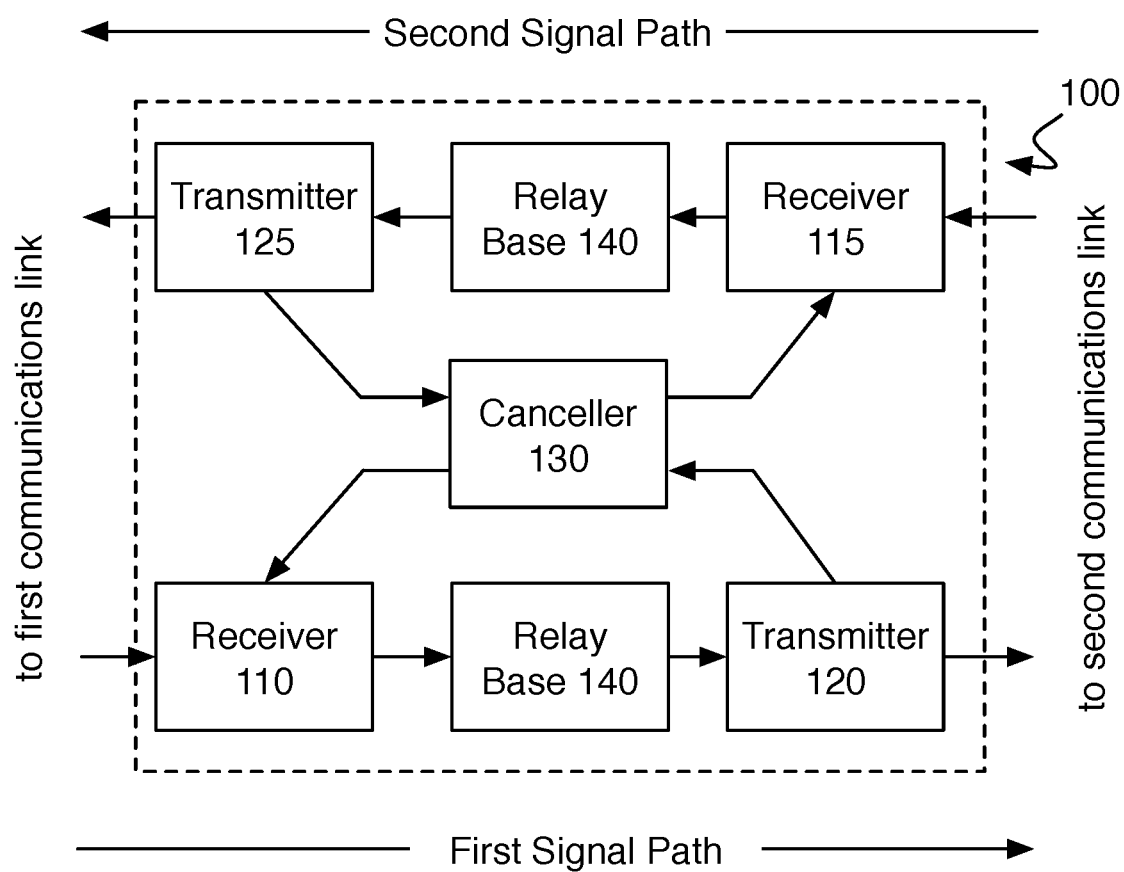
FIG. 9 is a diagram representation of a system of a preferred embodiment.

In the above description of the preferred embodiments, it is mentioned that the relay 100 may form transmit signals by processing receive signals (e.g., by phase shifting, amplifying, attenuating, frequency shifting, etc.). In a variation of a preferred embodiment, processing may be performed by relay bases 140 positioned between transmitters and receivers, as shown in FIG. 9. A relay base 140 may be a layer 1 (L1) relay, a layer 2 (L2) relay, a layer 3 (L3) relay, or any other suitable relay. Relay bases 140 preferably function to prepare signals for retransmission; for example, a relay base 140 may reorganize information before retransmitting to increase transmission efficiency. As another example, a relay base 140 may delay a signal before retransmission to time it with a particular transmission window.

Figure 10:
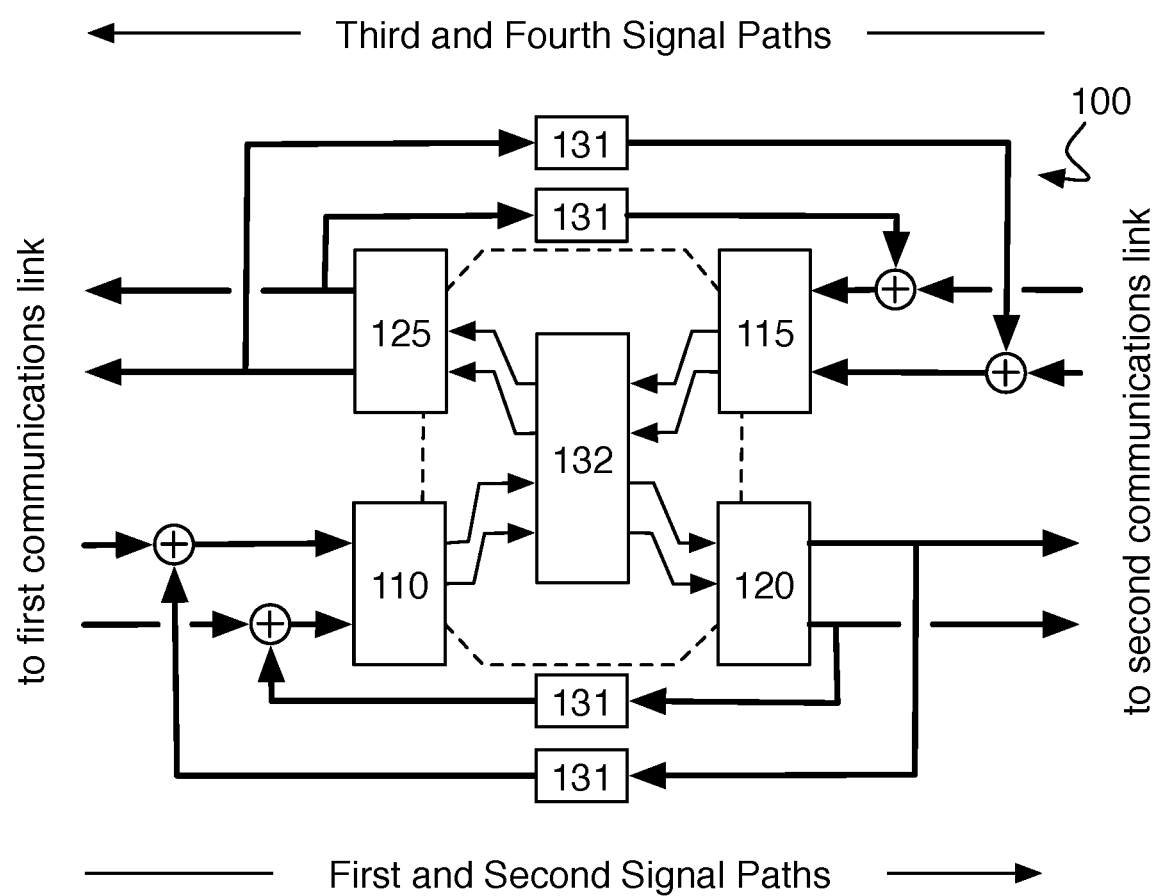
FIG. 10 is a diagram representation of a system of a preferred embodiment.

While the examples above are directed to single-in/single-out (SISO) relays, it is understood that the relay 100 may also be used for multiple-in/multiple-out (MIMO) communications, as shown in FIG. 10. MIMO technology may offer increased data throughput and link range without the need for additional bandwidth or increased transmitter power.

Figure 11A:
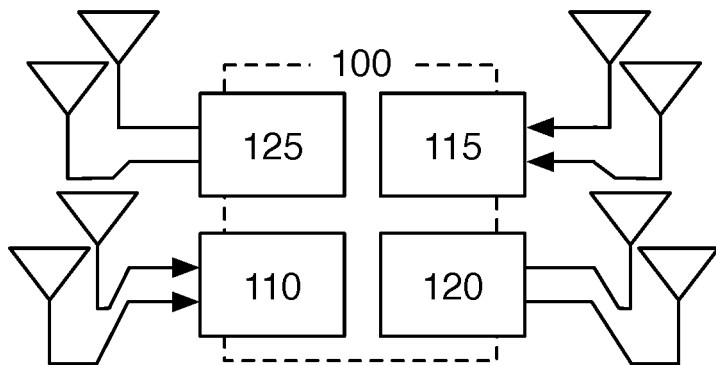
FIGS. 11A, 11B and 11C are diagram representations of antenna couplings of a system of a preferred embodiment.
Figure 11B:
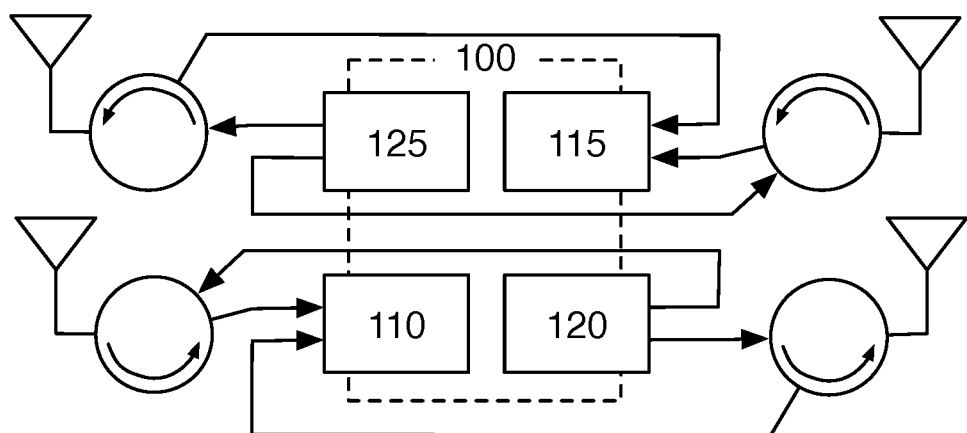
Figure 11C:
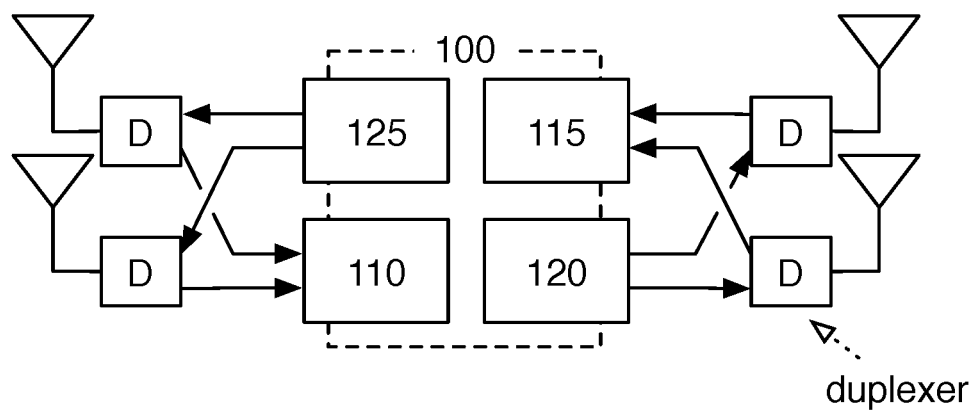

The example relay 100 as shown in FIG. 10 represents a 2×2 MIMO system, but it is understood that the relay 100 may additionally or alternatively utilize any suitable number of transmit and receive signals. Each signal path may have separate antennas; alternatively, signal paths may share antennas via a duplexer or other coupler. In one example, each signal path of a 2×2 MIMO relay has four antennas: a TX1 antenna, a TX2 antenna, an RX1 antenna, and an RX2 antenna, as shown in FIG. 11A. In another example, each signal path of a 2×2 MIMO system has two antennas: a TX1/RX1 antenna (coupled to both TX1 and RX1 signal paths via a circulator) and a TX2/RX2 antenna (coupled to both TX2 and RX2 signal paths via a circulator), as shown in FIG. 11B. In a third example, each signal path of a 2×2 MIMO system is again associated with four antennas, but the relay 100 has only four antennas total; a duplexer is used to couple each antenna to both a TX and an RX signal (where the TX and RX signals are from different signal paths), as shown in FIG. 11C.

As shown in FIGS. 11A and 11B, the first and second transmitters 120 and 125 are preferably implementations having multiple inputs and outputs. In particular, each transmitter preferably includes a DAC and frequency upconverter for each transmit signal path; additionally or alternatively, transmit signal paths may share DACs and/or frequency upconverters. Additionally or alternatively, each transmitter may be any suitable MIMO transmitter; for example, transmitters may include MIMO signal splitting or processing circuitry (which may be used to process a single digital signal into multiple MIMO analog signals).

The first and second receivers no and 115 are preferably implementations having multiple inputs and outputs. In particular, each receiver preferably includes an ADC and frequency downconverter for each receive signal path; additionally or alternatively, receive signal paths may share ADCs and/or frequency downconverters. Additionally or alternatively, receivers may be any suitable MIMO receiver; for example, receivers may include MIMO signal splitting or processing circuitry (which may be used to process multiple MIMO analog signals into a single digital signal).

Figure 12:
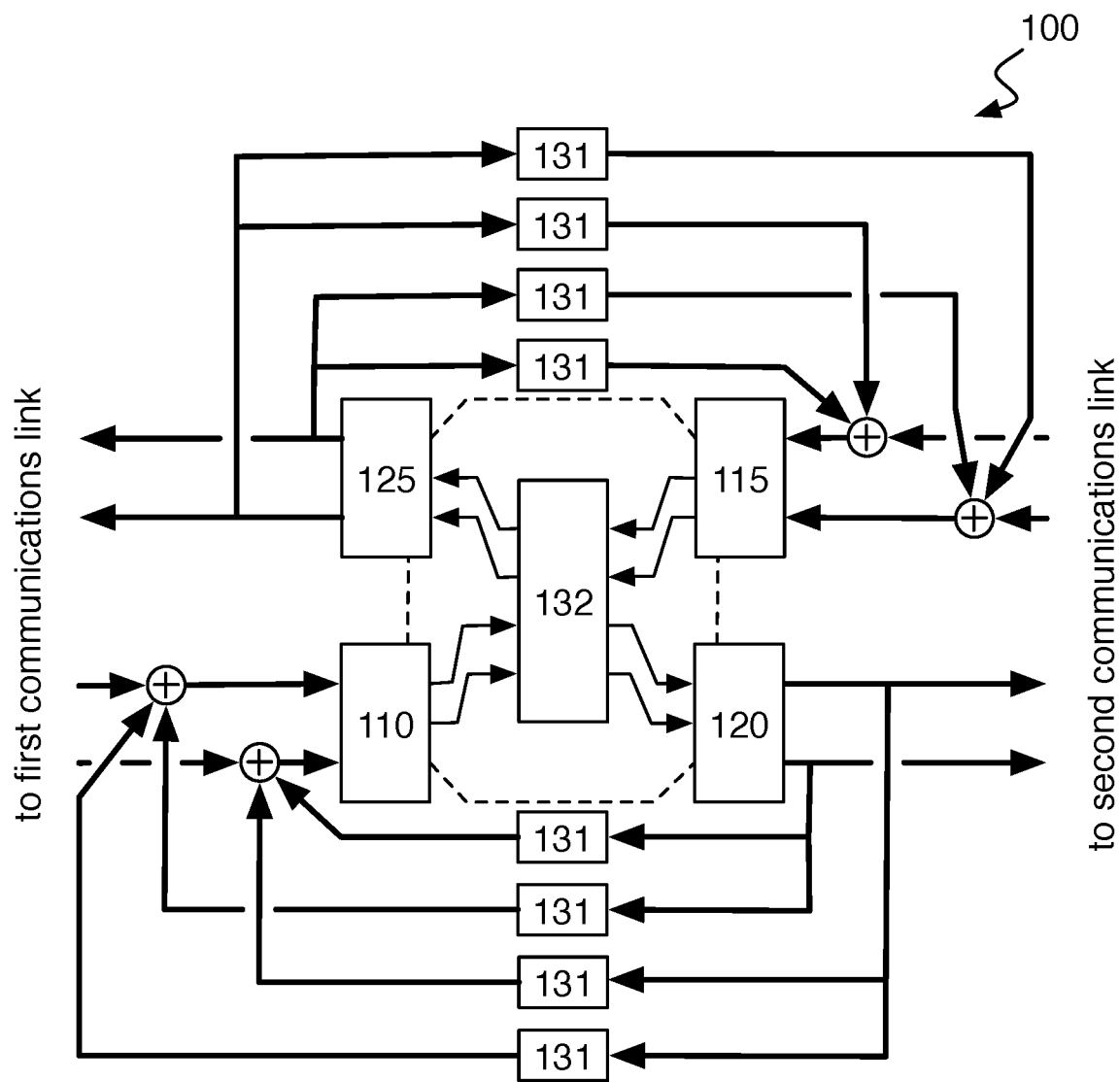
FIG. 12 is a diagram representation of a system of a preferred embodiment.

In an embodiment of the relay 100 designed for MIMO operating environments (i.e., multiple transmit and/or receive signals), the relay 100 preferably includes analog self-interference cancellers 131 for each pair of receive/transmit signals, as shown in FIG. 10. In MIMO operating environments, self-interference may occur across communications streams in addition to in them; for example, a TX1 signal may cause interference in both of RX1 and RX2 signals. As a result, the relay 100 may additionally or alternatively include analog self-interference cancellers 131 for self-interference cancellation across communications streams, as shown in FIG. 12. Cross-stream cancellation may additionally or alternatively be combined with cross-directional cancellation (which is as shown in FIG. 7).

In an embodiment of the relay 100 designed for MIMO operating environments (i.e., multiple transmit and/or receive signals), the digital self-interference canceller 132 may perform digital self-interference cancellation on each MIMO digital receive signal, but may additionally or alternatively perform digital self-interference cancellation on a combined digital receive signal (resulting from the combination of MIMO digital receive signals). If the digital self-interference canceller 132 performs self-interference cancellation for multiple MIMO digital receive signals, cancellation may be performed for each TX/RX pairing, similarly to those described in the section on the analog self-interference canceller 131.

3. Optically-Enhanced Analog Self-Interference Cancellation

As previously stated, the use of optical, photonic, or related technologies may provide benefits to full duplex relays (and other applications of self-interference cancellation). Ultimately, photonic circuits do not greatly change integration of analog self-interference cancellation with an external system. In traditional analog self-interference cancellers, cancellers are implemented using analog electronics and transform an analog transmit signal into an analog self-interference cancellation signal. Frequently, portions of analog self-interference cancellation systems operate at frequencies other than RF transmit/receive signals (e.g., Intermediate Frequency (IF)/baseband), in which case, the systems may include frequency converters that change the transceiver operating frequency to a "cancellation frequency" (the operating frequency of a canceller or a section of a canceller) to generate a cancellation signal and then frequency converters that bring the cancellation frequency back to a transceiver operating frequency. While transforming signals from the RF/IF domains to the optical domain uses different components than transforming signals from, say, RF to IF and back, the principle of "convert the signal, process the signal, and convert the signal back" is the same. Thus, it is easy for an analog self-interference canceller to take advantage of the gains provided by optical enhancement; in places where optical circuitry replaces traditional electronic circuitry, the optical circuitry typically performs the same tasks, meaning that canceller designers can switch between optical and electronic solutions fairly interchangeably (although of course those choices have consequences, such as circuit performance, circuit size, cost, etc.).

The optically-enhanced analog self-interference canceller 200 functions, via implementation of analog-to-optical and optical-to-analog converters, to enable self-interference cancellation that can take advantage of the benefits of optical components while still using analog circuitry where (or if) necessary. The optically-enhanced analog self-interference canceller 200 preferably transforms a transmit signal or transmit signal component into an analog self-interference cancellation signal by upconverting the input signal to the optical domain, combining a set of filtered, scaled, and/or delayed versions of the input signal to form an optical self-interference cancellation signal, and then downconverting the optical self-interference cancellation signal to enable combination with a received signal (or after combination). The transformed signal (the analog self-interference cancellation signal) preferably represents at least a part of the self-interference component received at the receiver.

Figure 13:
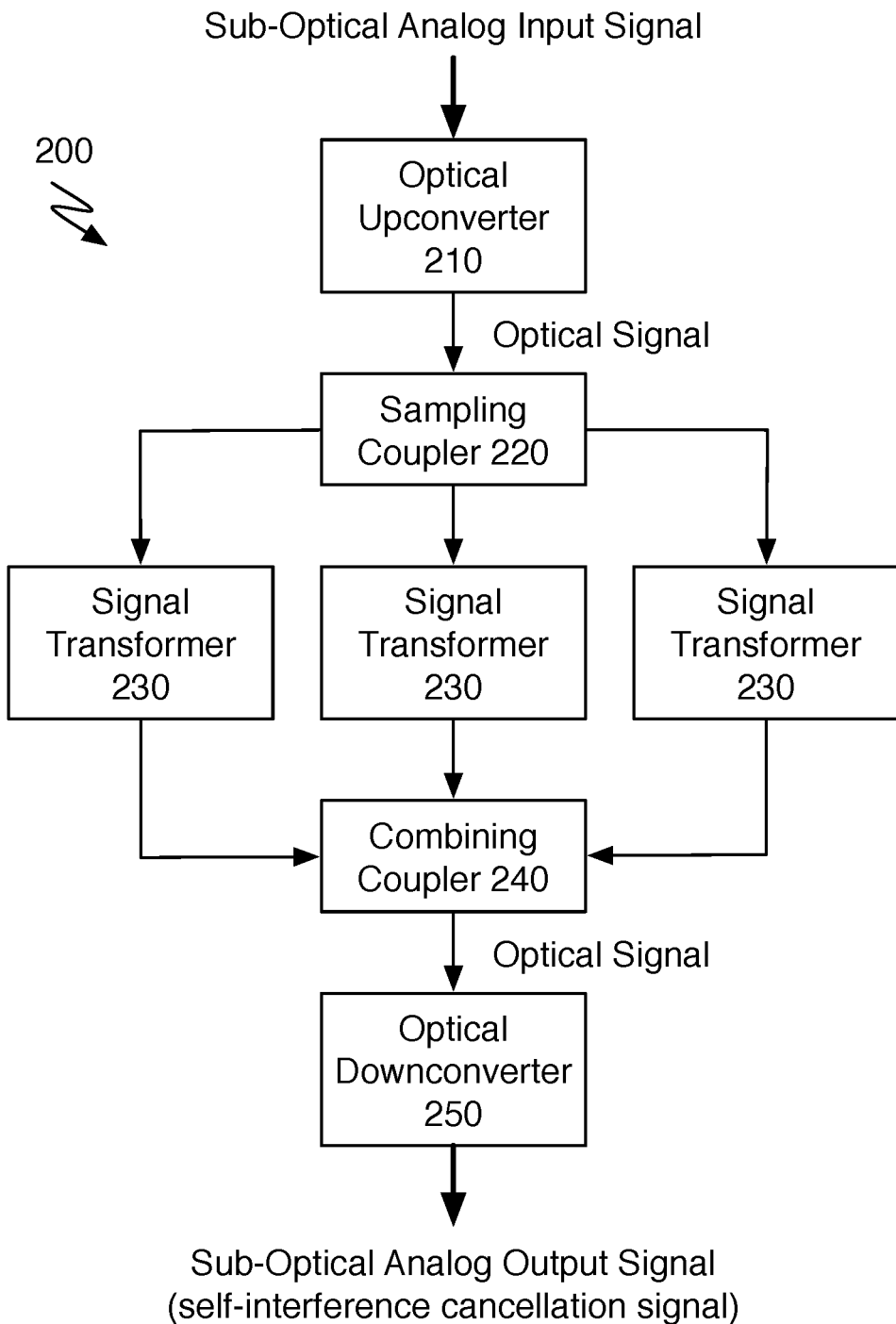
FIG. 13 is a diagram representation of an optically-enhanced analog self-interference canceller of a preferred embodiment.

The optically-enhanced analog self-interference canceller 200 may include optical upconverters 210, sampling couplers 220, signal transformers 230 (including filters 231, scalers 232, delayers 233 and phase shifters 234), combining couplers 240, and/or optical downconverters 250, as shown in FIG. 13.

The optical upconverters 210 function to convert a sub-optical-frequency analog signal (e.g., an RF, IF, or baseband signal) to an optical-frequency signal. The optical upconverters 210 may operate by using an ADC to convert the analog signal into a digital signal, and then convert the digital signal to an optical signal using a modulated laser. Alternatively, the optical upconverters 210 may directly convert the analog frequency signal to an optical signal (e.g., using an RF amplifier to control a Fabry-Perot laser); or the optical upconverters 210 may convert any sub-optical-frequency signal to any optical frequency signal in any manner. Note that while the canceller 200 preferably takes as input an analog signal, the canceller 200 may additionally or alternatively utilize a directly modulated laser or other optical signal source that may take a purely digital input, rather than an analog one.

Optical signals are preferably fiber-coupled infrared electromagnetic waves, but may additionally or alternatively be any signals in the infrared, visible, or ultraviolet spectra.

The sampling coupler 220 functions to split the transmit signal (or other signal components) into multiple transmit signal paths. Sampling couplers 220 preferably split an input signal into multiple signals having substantially the same waveform as the input signal; power may be split among output signals in any manner.

The sampling coupler 220 is preferably a transmission line power divider, but may additionally or alternatively be any suitable power divider, splitter, or coupler. The sampling coupler 220 may additionally contain any suitable electronics for pre-processing the transmit signal; for example, the sampling coupler 220 may contain an amplifier to increase the power contained in one or more of the output signals. Sampling couplers 220 may additionally or alternatively include switches or other components enabling the selective routing of signals.

Note that sampling couplers 220 may be present in either or both the radio (e.g., RF/IF) bands (e.g., pre-optical-upconversion or post-optical-downconversion) and optical bands (e.g., post-optical-upconversion and pre-optical-downconversion).

Signal transformers 230 function to amplify, attenuate, time delay, phase shift, invert. and/or filter signal components. Phase shifting and/or time delaying can allow the canceller 200 to reflect the contribution of multiple signal components with offset phase/time, while signal scaling (e.g., attenuation, amplification, inversion) enables the canceller to appropriately match self-interference cancellation signal components to predicted or observed self-interference present in receive signals. Signal transformers 230 may be invariant in frequency response across a given band of operation or may alternatively be variant across the same band (e.g., acting as a filter).

While signal transformers 230 may include filters 231, scalers 232, delayers 233 and/or phase shifters 234, signal transformers 230 may additionally or alternatively perform the tasks of multiple of these devices. For example, a fiber ring resonator may be used as a delay element for a given signal transformer 230, but such a ring resonator may have frequency-dependency in terms of both loss and time delay/phase shift. Thus, an array of fiber ring resonators in parallel having different frequency responses, while serving as a set of delayers 233 in parallel, also serves as a filter 231 together.

Filters 231 may be passive or active (e.g., include amplification) and may be any type of filter having any frequency response (e.g., bandpass, stopband, allpass, lowpass, highpass, longpass, shortpass). Filters 231 may operate based on a frequency resonance, polarization, or any other optical characteristic. Filters 231 may utilize waveguides, gratings, couplers, resonators (including single ring resonators, compound ring resonators, Mach Zehnder interferometers), splitters, switches, and/or cavities. Filters 231 may include infinite impulse response (IIR) and finite impulse response (FIR) filters.

Scalers 232 effectively multiply input signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Scale factors may be complex; for example, a scale factor of e^(i π/2) might be represented as a phase shift of ninety degrees. Scalers 232 may be implemented in any manner (e.g., optical amplifiers or attenuators).

Delayers 233 function to time delay a signal. Delayers 233 are preferably integrated into filters 231 but may be implemented in any manner (e.g., a switched optical transmission line delayer with low self-coupling). For example, delayers 233 may be implemented via a SCISSOR (Side-Coupled Integrated Space Sequence of Resonators), CROW (Coupled Resonator Optical Waveguides), Loaded MZT (Loaded Mach Zehnder Interferometer), single-resonator delay, or any other optical circuit.

Phase shifters 234 function to change the phase of a signal. Phase shifters 234 may be similar to delayers 233, though a pure phase shifter 234 may have a flat phase response over some frequency band of interest while a pure delayer 233 may have a linear phase response over some frequency band of interest (the former resulting in constant phase shift but variable delay across the band, the latter resulting variable phase shift but constant time delay across the band). Delayers 233 and/or phase shifters 234 may be implemented in signal transformers 230 in any manner.

Signal transformers 230 may be implemented in any manner using any optical, photonic, phonon-photonic, micro-electrical-mechanical systems (MEMS), nano-electrical-mechanical systems (NEMS), light, acoustic, opto-acoustic, mechanical, opto-mechanical, electrical, opto-electrical or otherwise-optically-or-acoustically-related techniques.

Figure 14:
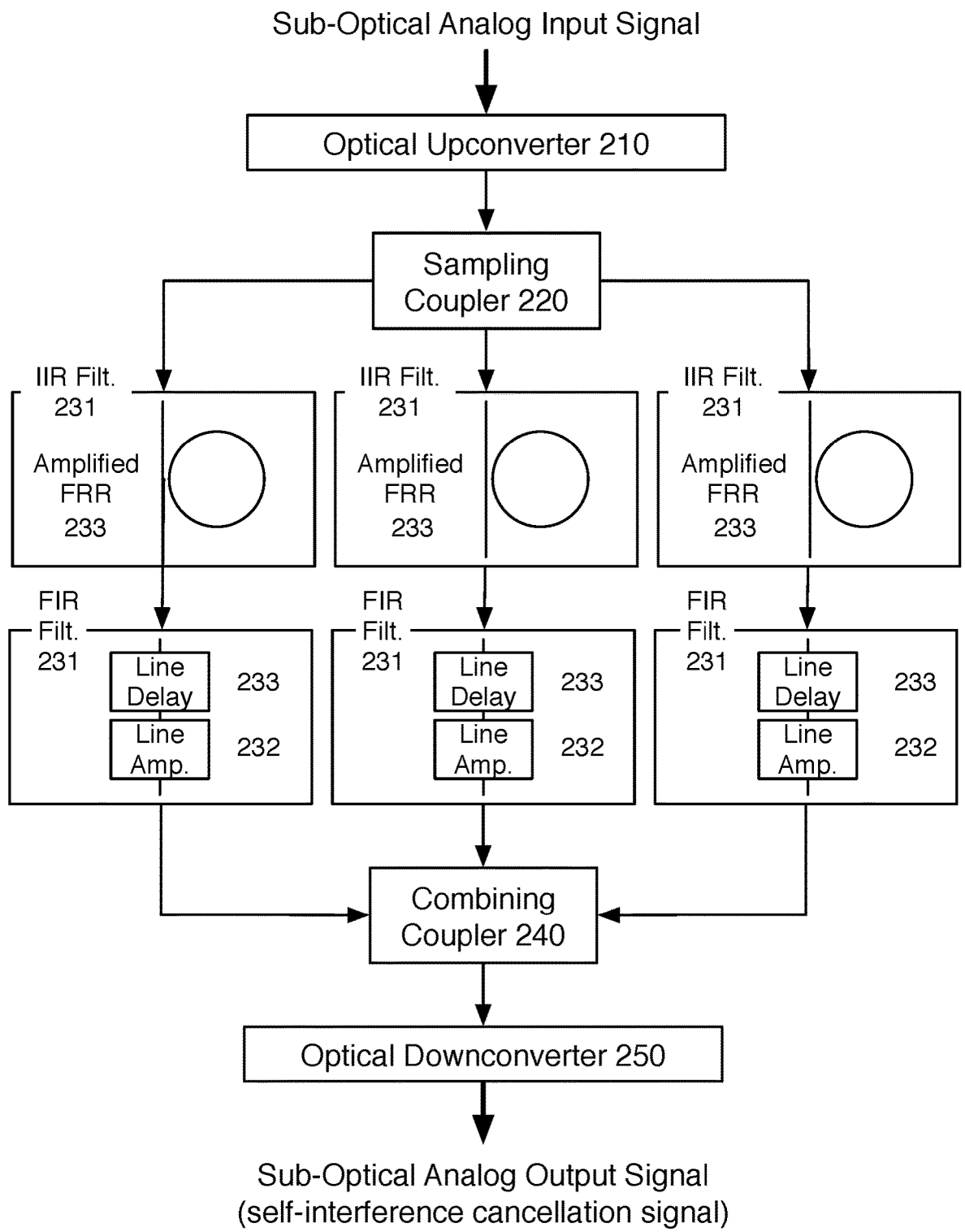
FIG. 14 is a diagram representation of an optically-enhanced analog self-interference canceller of a preferred embodiment.

In one implementation of an invention embodiment, signal transformers 230 are integrated into optical infinite impulse response (IIR) filters and optical finite impulse response (FIR) filters, as shown in FIG. 14. In traditional self-interference cancellation systems, signal transformation would be accomplished using RF electronics. The use of optical filters does not substantially change the functional aspects of self-interference cancellation signal generation (e.g., scaling, delaying, filtering, and/or phase shifting signal components and combining them in a manner ideally representative of the self-interference components present in a receive signal).

In this implementation, examples of optical IIR filters include fiber ring resonators, which (depending on design and tuning characteristics) may function as fixed (preferably) or variable (alternatively) time delayers. Fiber ring resonators may optionally include amplification (which may again may be fixed or variable). Examples of optical FIR filters may be formed from the series combination of optical transmission line delay elements (e.g., switched lengths of optical fiber) and optical amplifiers.

Figure 15:
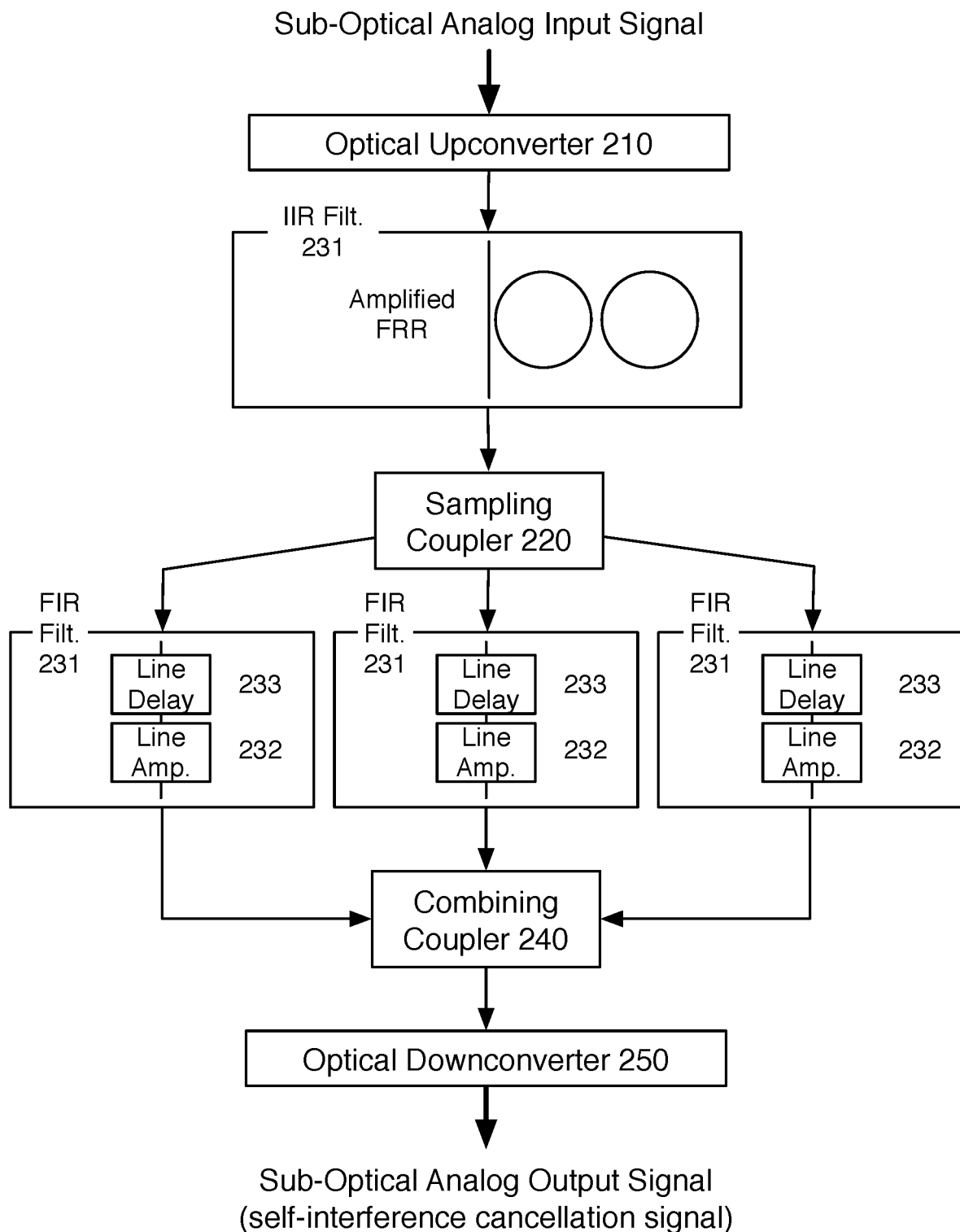
FIG. 15 is a diagram representation of an optically-enhanced analog self-interference canceller of a preferred embodiment.
Figure 16A:
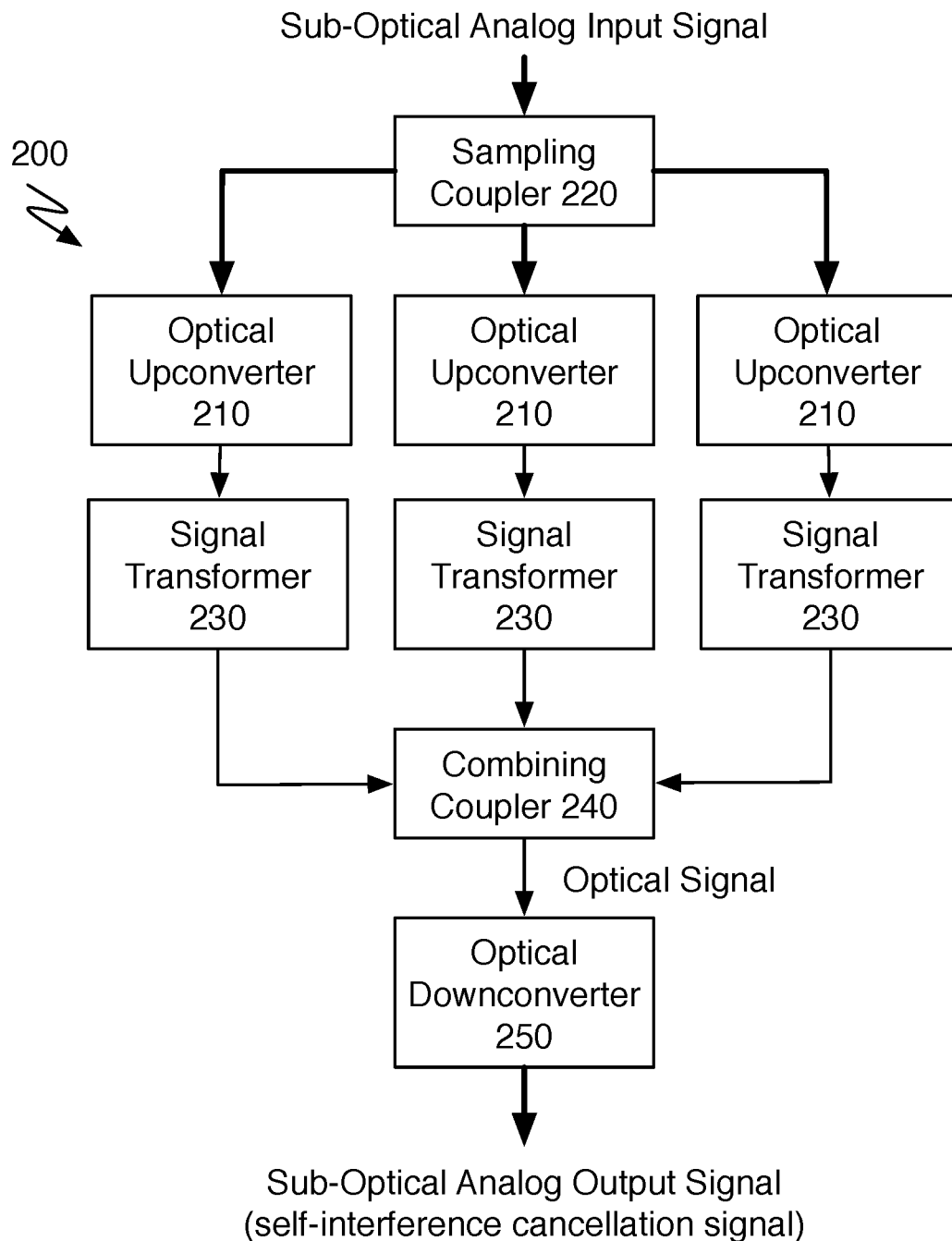
FIG. 16A is a diagram representation of an optically-enhanced analog self-interference canceller of a preferred embodiment.
Figure 16B:
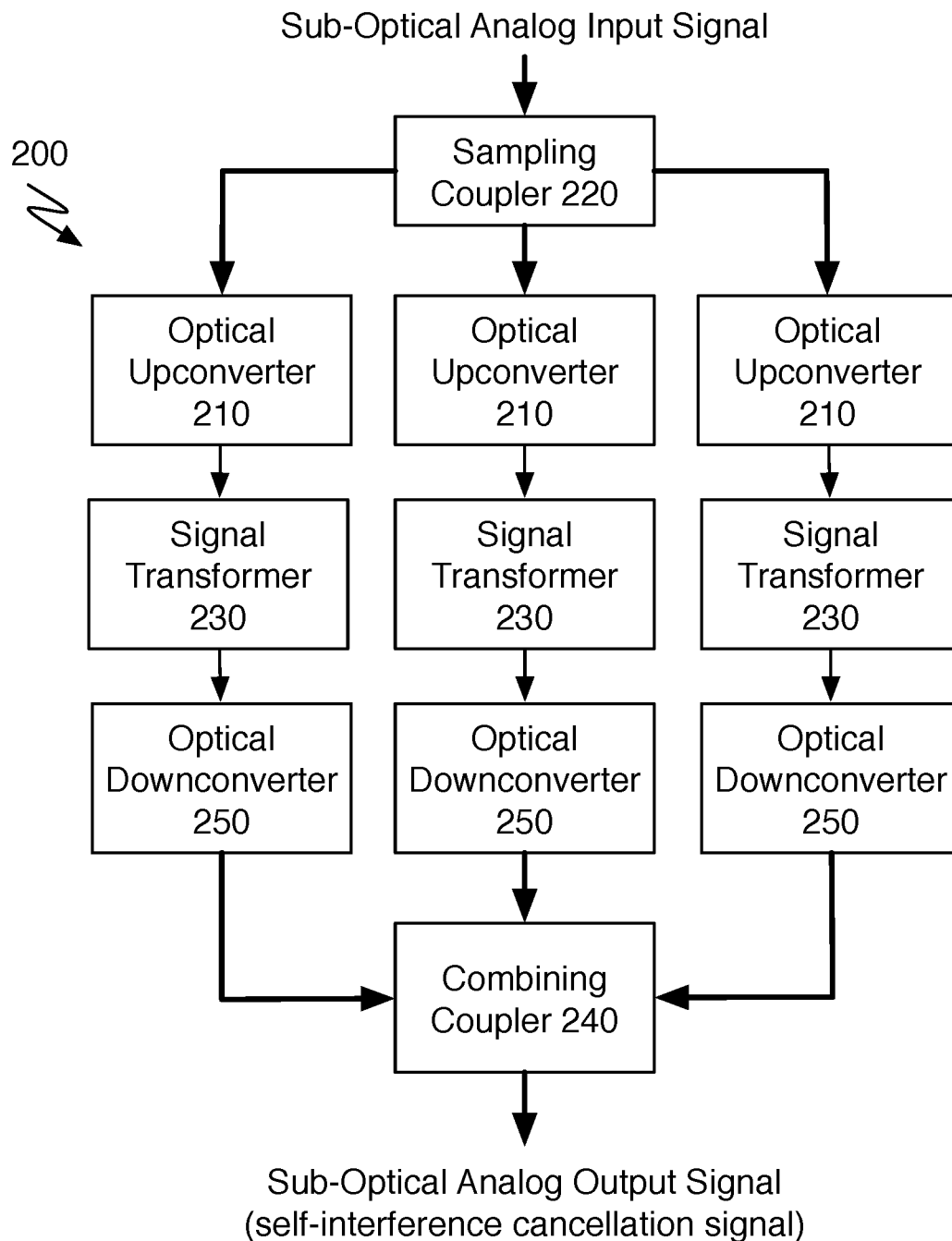
FIG. 16B is a diagram representation of an optically-enhanced analog self-interference canceller of a preferred embodiment.
Figure 16C:
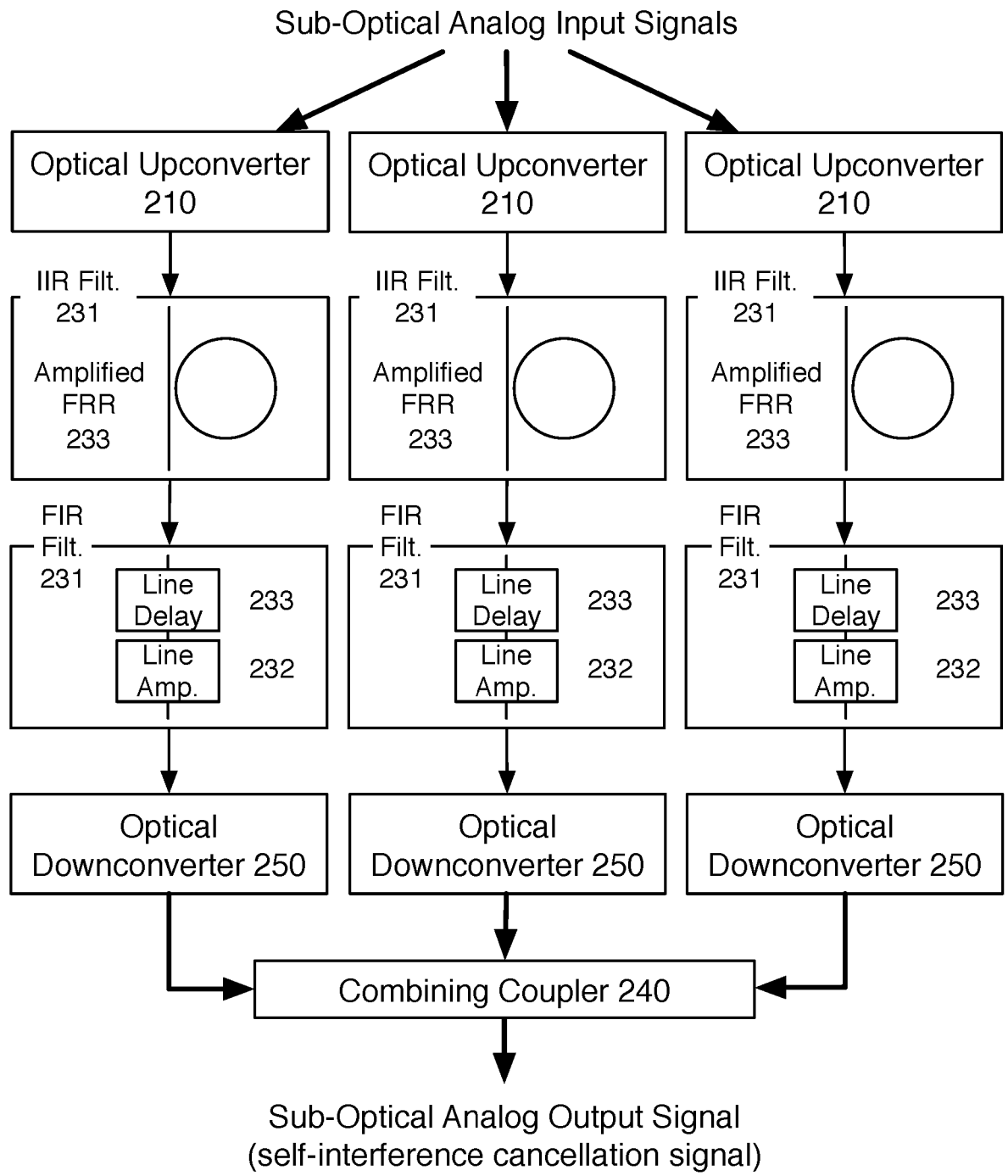
FIG. 16C is a diagram representation of an optically-enhanced analog self-interference canceller of a preferred embodiment.
Figure 16D:
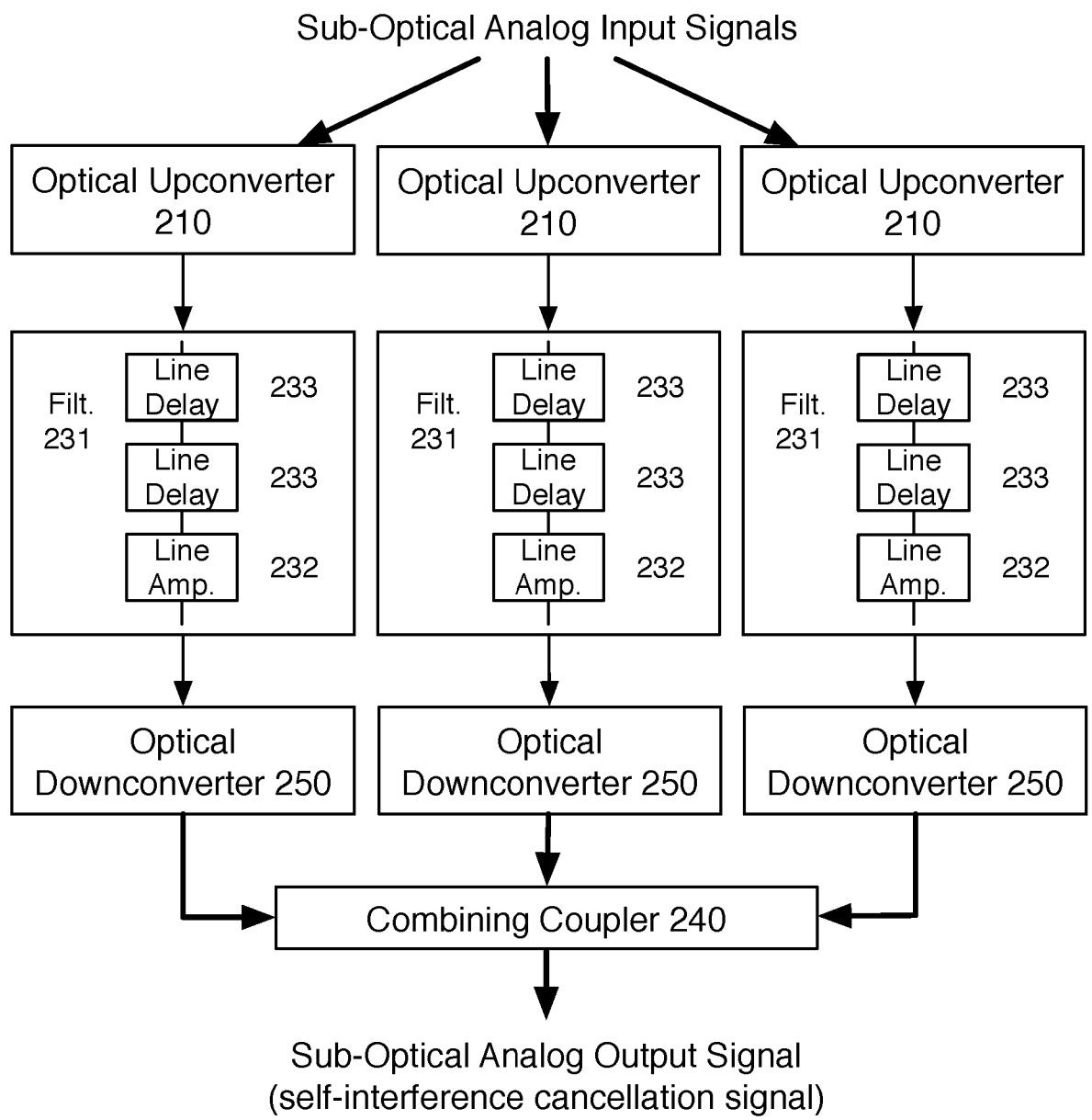
FIG. 16D is a diagram representation of an optically-enhanced analog self-interference canceller of a preferred embodiment.

In a second, related, implementation, a single IIR filter may be used as the input for multiple FIR filters in parallel, as shown in FIG. 15.

Combining couplers 240 function to combine optical self-interference cancellation signal components to generate an optical self-interference cancellation signal, which can then be downconverted to an RF/IF/baseband signal and combined with an analog receive signal (alternatively, combining couplers 240 may be used with both or either of RF/IF/baseband and optical signals). Combination with the analog receive signal to cancel self-interference preferable occurs at RF, but may additionally or alternatively include at any frequency, including as optical signals (e.g., the RF receive signal may be converted to an optical signal, combined with the self-interference cancellation signal, and then the resulting composite signal may be downconverted back to RF). The combining coupler 240 preferably combines self-interference cancellation signal components (resulting from multiple signal paths) and outputs the resulting analog self-interference cancellation signal. The combining coupler 240 is preferably a transmission line coupler, but can additionally or alternatively be any suitable type of coupler (described in the sampling coupler 220 sections). Combining couplers 240 (like all other couplers of the system 200) may optionally contain amplification. The combining coupler 240 can additionally contain any suitable circuitry for post-processing the self-interference cancellation signal before outputting it; for example, the combining coupler 240 can contain an amplifier to increase the power of the self-interference cancellation signal. The combining coupler 240 may combine signal components to form signals (e.g., self-interference cancellation signal components can be combined to form a self-interference cancellation signal) but may additionally or alternatively combine signal components to form signal super-components, which can later be combined to form signals. Note that there is not any inherent physical difference between signal components, signal super-components, and signals; different terms are used to identify how a signal or signal component is ultimately used. For example, a set of first and second signal components may be combined to form a first super-component, a set of third and fourth signal components may be combined to form a second super-component, and the first and second super-components may be combined to form a signal (or a super-super-component if later combination was to occur, etc.).

Figure 17A:
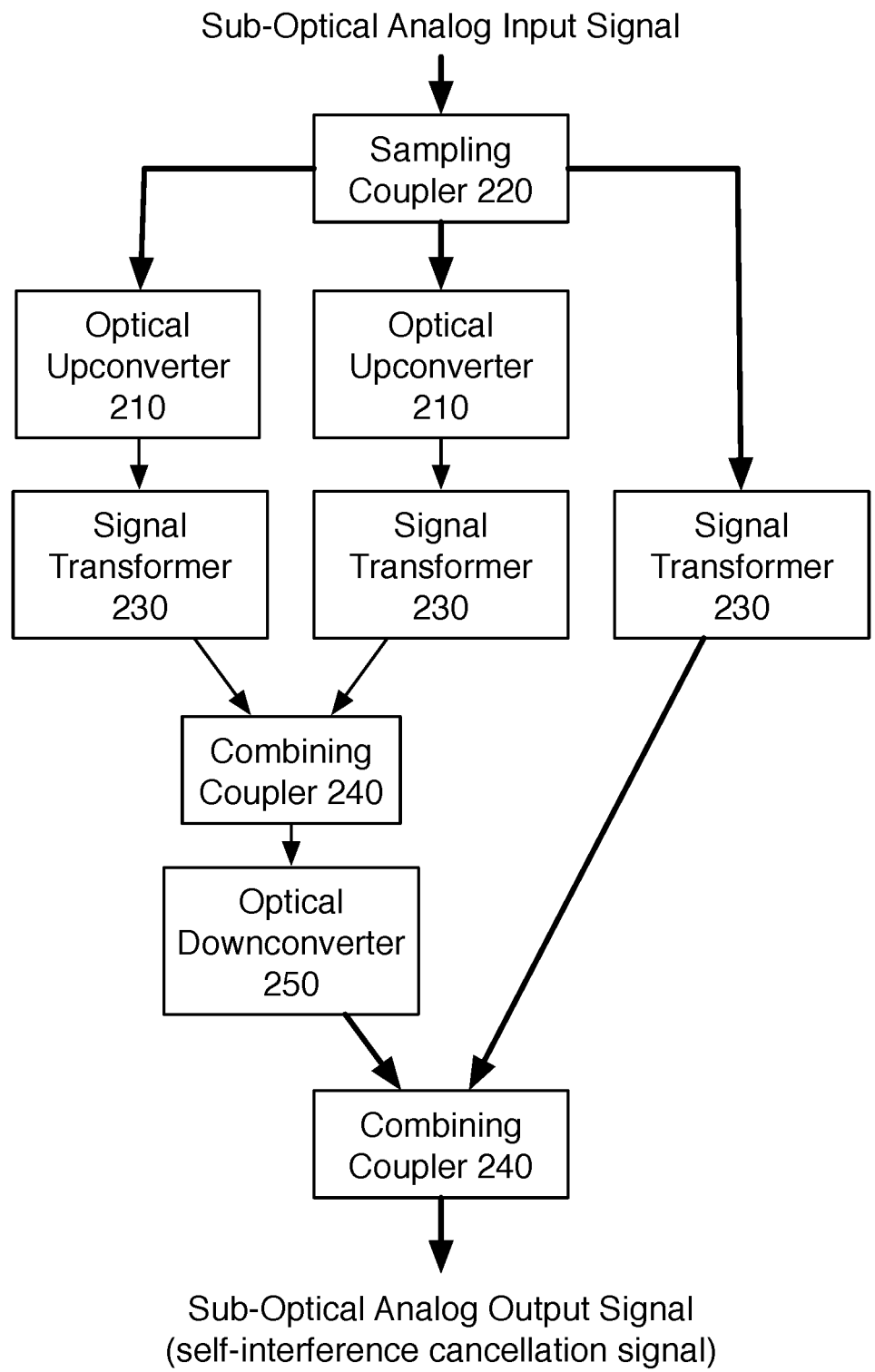
FIG. 17A is a diagram representation of an optically-enhanced analog self-interference canceller of a preferred embodiment.
Figure 17B:
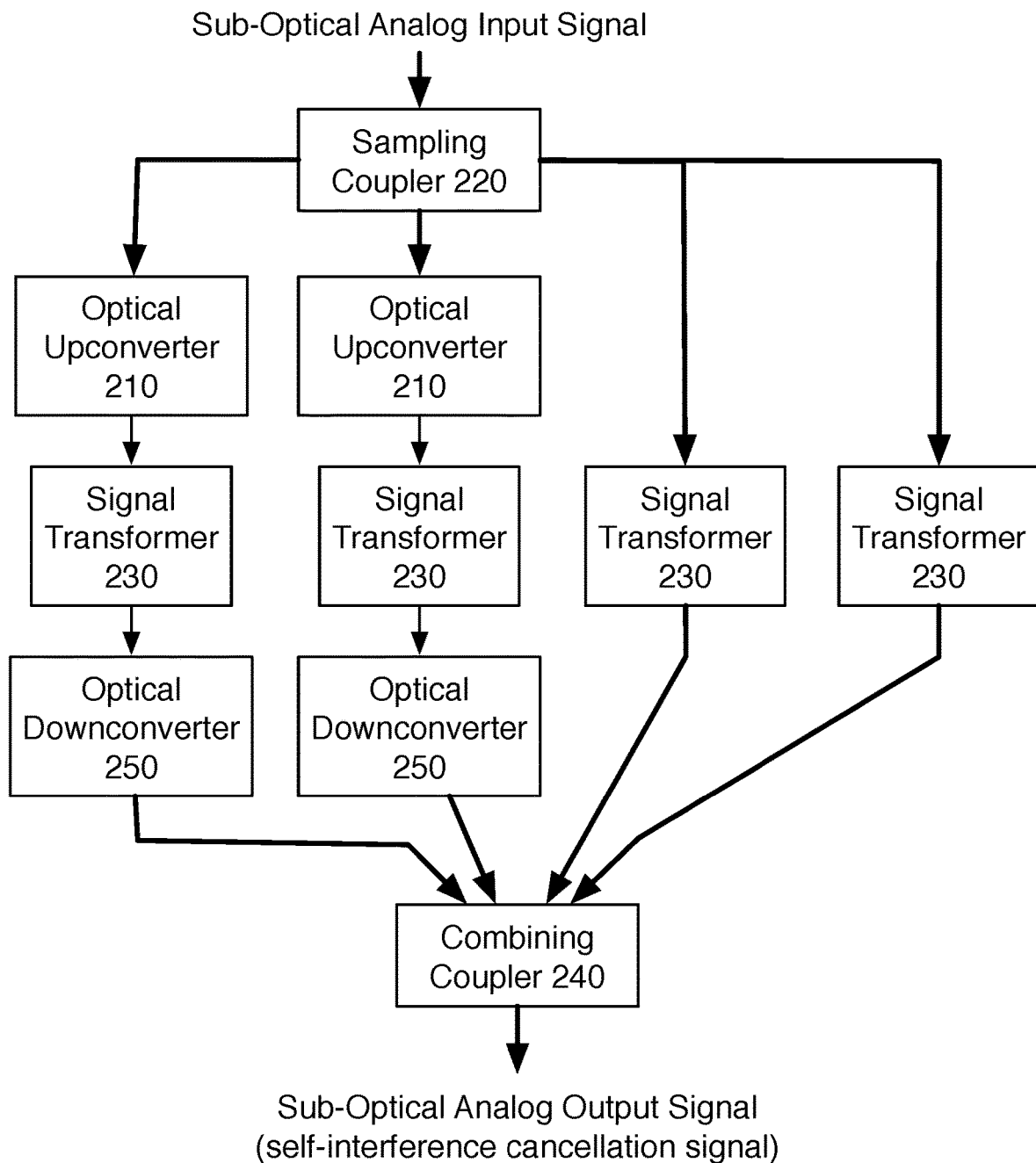
FIG. 17B is a diagram representation of an optically-enhanced analog self-interference canceller of a preferred embodiment.

Example implementations with couplers 220/240 in the RF/IF domain is as shown in FIGS. 16A, 16B, 16C, and 16D. Example implementations alongside non-optical cancellation is as shown in FIGS. 17A and 17B.

Optical downconverters 250 function to convert an optical frequency signal to a sub-optical-frequency analog signal (e.g., an RF, IF, or baseband signal). The optical downconverters 250 may operate using a balanced photodetector circuit to directly convert an optical signal to an analog signal, but the downconverters 250 may additionally or alternatively operate in any manner (e.g., via a photodetector, converting the optical signal first to a digital electrical signal and then converting that signal to an analog signal). Alternatively, the optical downconverters 250 may output digital signals.

The canceller 200 may be tuned or configured in any manner. Configuration parameters may include pre-processing settings, filter center frequency, frequency response, and/or Q factor, scale factor, signal delay, signal phase shift, post-processing settings and/or any other suitable configuration parameters. The configuration state of the canceller 200 may be set based upon the received RF/IF transmit signals, but may additionally or alternatively be based on any other suitable input. Suitable input may include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), optical signal characteristics, and/or any other input relating to self-interference present in the receive signal.

The canceller 200 preferably sets configuration states based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, the canceller 200 may set configuration states in any suitable manner.

The canceller 200 may adapt configuration states and/or configuration state generating/choosing algorithms using analytical methods, online gradient-descent methods (e.g., LMS, RLMS), and/or any other suitable methods. The canceller 200 may additionally or alternatively adapt configuration states and/or configuration state generating/choosing algorithms based on test input scenarios (e.g. scenarios when the signal received by the receiver is known), scenarios where there is no input (e.g. the only signal received at the receiver is the signal transmitted by the transmitter), or scenarios where the received signal is unknown. In cases where the received signal is an unknown signal, the canceller 200 may perform adaptation based on historical received data (e.g. what the signal looked like ten seconds in the past) or any other suitable information. The canceller 200 may additionally or alternatively perform adaptation based on the content of RF and/or IF transmit signals; for instance, if the RF transmit signal is modulated in a particular way, the tuning circuit may perform adaptation such that when the RF self-interference signal is combined with the RF receive signal the detected modulation (as an indicator of self-interference) is reduced.

As a person skilled in the art will recognize from the previous detailed description and from the figures and claims, modifications and changes can be made to the preferred embodiments of the invention without departing from the scope of this invention defined in the following claims.

We claim:

1. An optically-enhanced relay comprising:
   a first transmitter, coupled to a first signal path of the relay, that converts a first digital transmit signal received via the first signal path to a first analog transmit signal, and transmits the first analog transmit signal via the first signal path;
   a first receiver, coupled to the first signal path of the relay, that receives a first analog receive signal via the first signal path, and converts the first analog receive signal to a first digital receive signal;
   a second transmitter, coupled to a second signal path of the relay, that converts a second digital transmit signal received via the second signal path to a second analog transmit signal, and transmits the second analog transmit signal via the second signal path, wherein the relay is a single-input single-output relay, wherein the first and second transmitter are operable to transmit concurrently;
   a second receiver, coupled to the second signal path of the relay, that receives a second analog receive signal via the second signal path, and converts the second analog receive signal to a second digital receive signal;
   a first optically-enhanced analog self-interference canceller that generates a first self-interference cancellation signal based on at least one of the first digital transmit signal and the first analog transmit signal, and combines the first self-interference cancellation signal with at least one of the first digital receive signal and the first analog receive signal, wherein the optically-enhanced analog self-interference canceller comprises an optical upconverter, wherein generating the first self-interference cancellation signal comprises converting a signal to optical frequency at the optical upconverter;
   a second optically-enhanced analog self-interference canceller that generates a second self-interference cancellation signal based on at least one of the second digital transmit signal and the second analog transmit signal, and combines the second self-interference cancellation signal with at least one of the second digital receive signal and the second analog receive signal;
   a third optically-enhanced analog self-interference canceller that generates a third self-interference cancellation signal based on at least one of the first digital transmit signal and the first analog transmit signal, and combines the third self-interference cancellation signal with at least one of the second digital receive signal and the second analog receive signal; and
   a fourth optically-enhanced analog self-interference canceller that generates a fourth self-interference cancellation signal based on at least one of the second digital transmit signal and the second analog transmit signal, and combines the fourth self-interference cancellation signal with at least one of the first digital receive signal and the first analog receive signal.

2. The optically-enhanced relay of claim 1, wherein the optical upconverter is communicatively coupled to the analog transmit signal, wherein the signal is the analog transmit signal, wherein the optical upconverter converts the analog transmit signal to an optical transmit signal; wherein the optically-enhanced analog self-interference canceller further comprises a set of signal transformers that transform the optical transmit signal into optical self-interference cancellation signal components; wherein the optically-enhanced analog self-interference canceller generates the first self-interference cancellation signal from the optical self-interference cancellation signal components.

3. The optically-enhanced relay of claim 2, wherein the optically-enhanced analog self-interference canceller further comprises an optical downconverter and a combining coupler; wherein the optical downconverter converts the optical self-interference cancellation signal components to analog self-interference cancellation signal components; wherein the combining coupler combines the analog self-interference cancellation signal components to form the first self-interference cancellation signal.

4. The optically-enhanced relay of claim 3, wherein the optically-enhanced analog self-interference canceller further comprises a sampling coupler; wherein the sampling coupler splits the analog transmit signal into analog transmit signal components prior to optical upconversion; wherein the optical upconverter converts the analog transmit signal components to optical transmit signal components; wherein the set of signal transformers transforms the optical transmit signal by transforming the optical transmit signal components into optical self-interference cancellation signal components.

5. The optically-enhanced relay of claim 3, wherein the optically-enhanced analog self-interference canceller further comprises a sampling coupler; wherein the sampling coupler splits the optical transmit signal into optical transmit signal components after optical upconversion; wherein the set of signal transformers transforms the optical transmit signal by transforming the optical transmit signal components into optical self-interference cancellation signal components.

6. The optically-enhanced relay of claim 2, wherein the optically-enhanced analog self-interference canceller further comprises an optical downconverter and a combining coupler; wherein the combining coupler combines the optical self-interference cancellation signal components to form an optical self-interference cancellation signal; wherein the optical downconverter converts the optical self-interference cancellation signal to form the first self-interference cancellation signal.

7. The optically-enhanced relay of claim 4, wherein the optical downconverter comprises a photodetector circuit.

8. The optically-enhanced relay of claim 6, wherein the optically-enhanced analog self-interference canceller further comprises a sampling coupler; wherein the sampling coupler splits the analog transmit signal into analog transmit signal components prior to optical upconversion; wherein the optical upconverter converts the analog transmit signal components to optical transmit signal components; wherein the set of signal transformers transforms the optical transmit signal by transforming the optical transmit signal components into optical self-interference cancellation signal components.

9. The optically-enhanced relay of claim 6, wherein the optically-enhanced analog self-interference canceller further comprises a sampling coupler; wherein the sampling coupler splits the optical transmit signal into optical transmit signal components after optical upconversion; wherein the set of signal transformers transforms the optical transmit signal by transforming the optical transmit signal components into optical self-interference cancellation signal components.

10. The optically-enhanced relay of claim 9, wherein the optical upconverter comprises a radio-frequency (RF) amplifier and a laser.

11. The optically-enhanced relay of claim 9, wherein the set of signal transformers generate the optical self-interference cancellation signal components by scaling and delaying the optical self-interference cancellation signal components.

12. The optically-enhanced relay of claim 11, wherein the set of signal transformers comprise both finite impulse response (FIR) and infinite impulse response (IIR) filters.

13. The optically-enhanced relay of claim 12, wherein the set of signal transformers are split into a set of parallel signal paths; wherein each parallel signal path comprises one or more FIR filters in series with one or more IIR filters.

14. The optically-enhanced relay of claim 13, wherein the IIR filters of the optically-enhanced relay comprise a fiber-ring resonator.

15. The optically-enhanced relay of claim 14, wherein the fiber-ring resonator is a compound ring resonator.

16. The optically-enhanced relay of claim 14, wherein the fiber-ring resonator is part of a Side-Coupled Integrated Space Sequence of Resonators (SCISSOR) delayer.

17. The optically-enhanced relay of claim 14, wherein the fiber-ring resonator is part of a coupled resonator optical waveguide (CROW) delayer.

18. The optically-enhanced relay of claim 11, wherein the set of signal transformers comprises a switched-line delayer.

19. The optically-enhanced relay of claim 18, wherein the set of signal transformers comprises an optical amplifier.

* * * * *